US008819107B2

(12) United States Patent
Amemiya et al.

(10) Patent No.: US 8,819,107 B2
(45) Date of Patent: Aug. 26, 2014

(54) RELAY APPARATUS, RECORDING MEDIUM STORING A RELAY PROGRAM, AND A RELAY METHOD

(75) Inventors: Kouichirou Amemiya, Kawasaki (JP); Kei Hamada, Fukuoka (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/090,508

(22) Filed: Apr. 20, 2011

(65) Prior Publication Data

US 2011/0282926 A1 Nov. 17, 2011

(30) Foreign Application Priority Data

May 14, 2010 (JP) ................. 2010-111760

(51) Int. Cl.
*G06F 15/16* (2006.01)
*G01R 31/08* (2006.01)
*H04L 1/00* (2006.01)

(52) U.S. Cl.
USPC ......... 709/201; 370/230; 370/230.1; 370/232

(58) Field of Classification Search
USPC .................. 709/201; 370/230, 230.1, 232
See application file for complete search history.

(56) References Cited

U.S. PATENT DOCUMENTS

| 6,373,845 | B1 * | 4/2002 | Aramaki et al. ........... 370/395.3 |
| 7,366,496 | B2 | 4/2008 | Vialen et al. |
| 7,510,113 | B2 | 3/2009 | Igarashi et al. |
| 7,672,237 | B2 | 3/2010 | Shimada |
| 7,725,934 | B2 | 5/2010 | Kumar et al. |
| 8,477,718 | B2 | 7/2013 | Dolganow et al. |
| 2002/0095512 | A1 * | 7/2002 | Rana et al. ..................... 709/232 |
| 2002/0105911 | A1 * | 8/2002 | Pruthi et al. ................... 370/241 |
| 2002/0120743 | A1 | 8/2002 | Shabtay et al. |
| 2003/0012144 | A1 * | 1/2003 | Nichols ......................... 370/252 |
| 2007/0171912 | A1 * | 7/2007 | Mitsumori ................. 370/395.1 |
| 2008/0151897 | A1 * | 6/2008 | Nemoto et al. ............... 370/392 |
| 2010/0020800 | A1 * | 1/2010 | Abe et al. ..................... 370/392 |
| 2010/0287227 | A1 * | 11/2010 | Goel et al. .................... 709/202 |

FOREIGN PATENT DOCUMENTS

| JP | 11-068766 | 3/1999 |
| JP | 2000-244562 | 9/2000 |
| JP | 2002-237787 | 8/2002 |
| JP | 2002-335268 | 11/2002 |
| JP | 2003-179647 A | 6/2003 |
| JP | 2003-524336 | 8/2003 |
| JP | 2003-338829 | 11/2003 |

OTHER PUBLICATIONS

Japanese Office Action mailed Nov. 19, 2013 for corresponding Japanese Application No. 2010-111760, with Partial English-language Translation.

* cited by examiner

*Primary Examiner* — Dustin Nguyen
*Assistant Examiner* — Shean Tokuta
(74) *Attorney, Agent, or Firm* — Fujitsu Patent Center

(57) ABSTRACT

A relay apparatus generates partial message data by assembling a package group, the packet group including, out of a plurality of packets received and related to one message, a head packet related to the one message up to a packet including, as a payload, user identification information in a header of the one message. The relay apparatus extracts the user identification information from the partial message data and identifying a user identifier from the user identification information. The relay apparatus performs a specific packet process, in accordance with the identified user identifier, on the packet group of the one message, and a packet not assembled by a packet assembling unit out of the plurality of packets.

7 Claims, 35 Drawing Sheets

FIG. 5

| # | TRANSMISSION SOURCE IP ADDRESS | DESTINATION IP ADDRESS | TRANSMISSION SOURCE PORT NUMBER | DESTINATION PORT NUMBER | STATE MANAGEMENT DATA | LINK TO ENTRY IN ASSEMBLY CONTROL TABLE |
|---|---|---|---|---|---|---|
| 1 | a1 | a2 | a3 | a4 | a5 | a6 |
| 2 | b1 | b2 | b3 | b4 | b5 | b6 |
| 3 | c1 | c2 | c3 | c4 | c5 | c6 |
| ⋮ | ⋮ | ⋮ | ⋮ | ⋮ | ⋮ | ⋮ |

FIG. 6

| # | ASSEMBLY FLAG | USER IDENTIFIER |
|---|---|---|
| 1 | FALSE | A |
| 2 | TRUE | – |
| 3 | TRUE | – |
| ⋮ | ⋮ | ⋮ |

FIG. 9

| DESTINATION IP ADDRESS | DESTINATION PORT NUMBER | DESTINATION URL | ASSEMBLY SETTING |
|---|---|---|---|
| - | 80 | - | HTTP HEADER |
| - | 5060 | - | SIP HEADER |
| ⋮ | ⋮ | ⋮ | ⋮ |

FIG. 11

| DESTINATION IP ADDRESS | DESTINATION PORT NUMBER | DESTINATION URI | IDENTIFICATION INFORMATION |
|---|---|---|---|
| - | 80 | - | URL |
| - | 5060 | - | FROM |
| ⋮ | ⋮ | ⋮ | ⋮ |

FIG. 12

| USER IDENTIFICATION INFORMATION | USER IDENTIFIER |
|---|---|
| AA | aa |
| BB | bb |
| ⋮ | ⋮ |

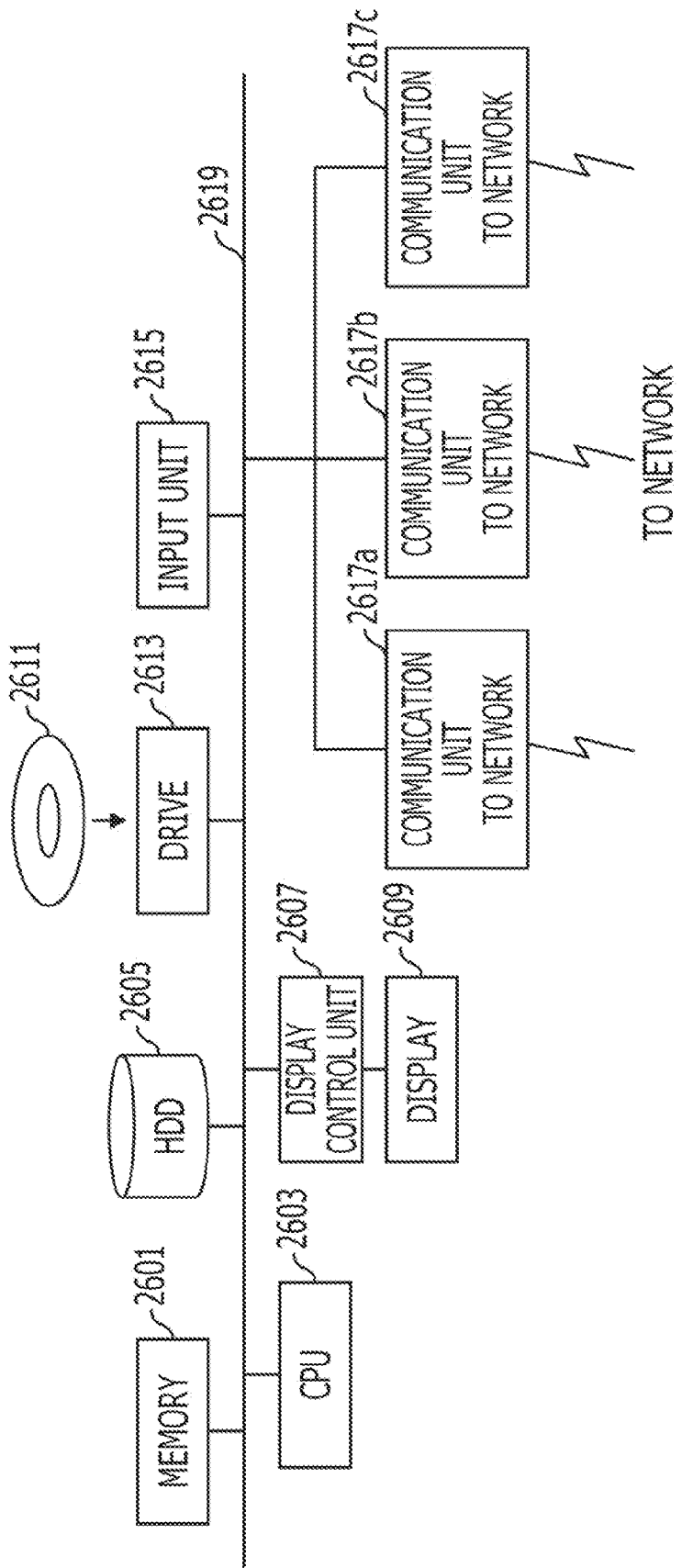

RELAY APPARATUS, RECORDING MEDIUM STORING A RELAY PROGRAM, AND A RELAY METHOD

CROSS-REFERENCE TO RELATED APPLICATIONS

This application is based upon and claims the benefit of priority of the prior Japanese Patent Application No. 2010-111760, filed on May 14, 2010, the entire contents of which are incorporated herein by reference.

FIELD

The present invention relates to a relay apparatus, recording medium storing a relay program, and a relay method.

BACKGROUND

The demand for multitenant systems is mounting as cloud environment spreads. The multitenant system refers to a system having a mechanism that allows a plurality of users and a plurality of tenants (e.g., business firms) to share and use the same server or the same database in a manner such that the users and the tenants are free from mutual interference. In the discussion that follows, the user and the tenant are simply referred to as a user. Not only the server and storage but also a relay apparatus is required to support multitenant feature.

FIG. 1 illustrates a system configuration of a system in the multitenant environment. Connected to a relay apparatus in FIG. 1 are application servers X-Z, user terminal C, and a gateway apparatus. The gateway apparatus is connected to user terminals A and B. Users respectively operating the user terminals A-C share the application servers X-Z. The relay apparatus relays requests from the user terminals A-C to the application servers X-Z, and responses from the application servers X-Z to the user terminals A-C.

In such a multitenant system, information identifying the user is difficult to obtain from each packet if a message with a payload of at least one packet assembled is not generated. For example, authentication information and a user certificate written in a uniform resource locator (URL) and a cookie of a hyper text transfer protocol (HTTP) header are not obtained without assembling messages.

If information identifying the user is not obtained without assembling the message, a relay apparatus processing only the packets has difficulty in identifying the user. The relay apparatus also has difficulty in performing a relay process on a per user basis. In such a case, an application server side is forced to perform a filtering process such as a firewall, and a statistical information collection process of statistical information used for billing each user for band usage. The workload on the sever side increases.

Techniques called cut-through and store-and-forward are available. In the store-and-forward technique, an entire Media Access Control (MAC) frame is stored and the content of the MAC frame is verified before the MAC frame is transferred. In the cut-through technique, the MAC frame is only partially checked before being transferred. The cut-through technique is performed on individual MAC frames. A variety of types of cut-through techniques are present but none of the techniques overcome the above-described problem.

The relay apparatus desirably performs the filtering process and the statistical information collection process of statistical information used for billing each user for band usage without imposing an additional workload on the server. Since the relay apparatus of FIG. 1 is installed between a plurality of user terminals and a plurality of application servers, the number of packets to be relayed is large. If messages are simply assembled for all the relay packets, the relay apparatus becomes a bottleneck, leading to a decrease in throughput.

SUMMARY

According to an aspect of the invention, a relay apparatus generates partial message data by assembling a package group, the packet group including, out of a plurality of packets received and related to one message, a head packet related to the one message up to a packet including, as a payload, user identification information in a header of the one message. The relay apparatus extracts the user identification information from the partial message data and identifying a user identifier from the user identification information. The relay apparatus performs a specific packet process, in accordance with the identified user identifier, on the packet group of the one message, and a packet not assembled by a packet assembling unit out of the plurality of packets.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 illustrates an example of a connection table;

FIG. 6 illustrates an example of an assembly control table;

FIG. 9 illustrates an example of an assembly setting table;

FIG. 11 illustrates an example of an identification rule table;

FIG. 12 illustrates an example of an identification table;

FIG. 35 is a functional block diagram illustrating a computer.

DESCRIPTION OF EMBODIMENTS

First Embodiment

Figure 1:
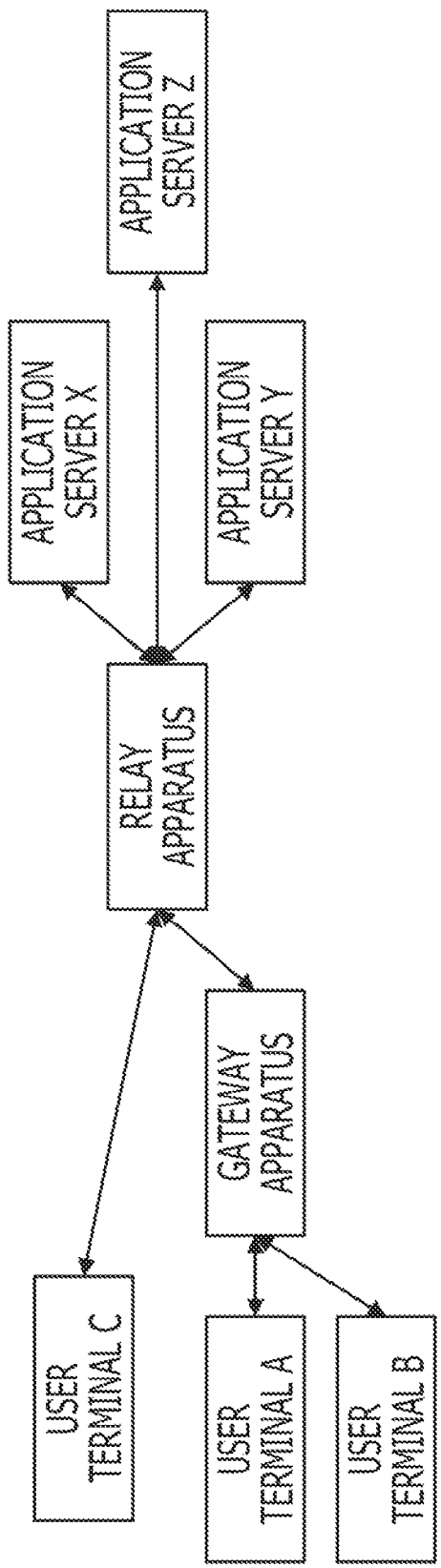
FIG. 1 illustrates a system configuration of related art.
Figure 2:
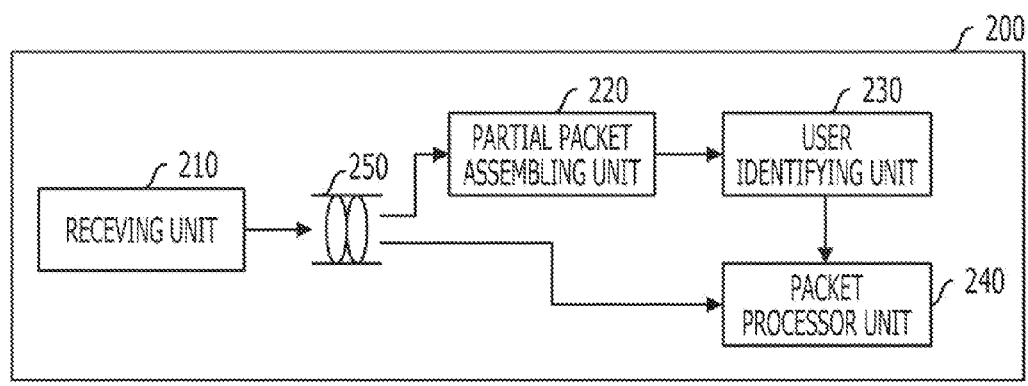
FIG. 2 is a functional block diagram illustrating a relay apparatus of a first embodiment.

As illustrated in FIG. 2, a relay apparatus 200 of a first embodiment of the technique described herein includes a receiving unit 210 receiving a packet, a queue 250 including data of the packet received by the receiving unit 210, a partial packet assembling unit 220 assembling part of a plurality of packets forming one message, a user identifying unit 230 identifying a user identifier from part of the message generated by the partial packet assembling unit 220, and a packet processor unit 240 performing specific packet processes including a filtering process and a packet counting process for billing, based on the user identifier identified by the user identifying unit 230 with respect to the received packet. The packet processor unit 240 outputs a packet, which is not a filtering target, to a destination thereof. This process remains unchanged from related art and is not related to the embodiment, and no further discussion thereabout is provided here.

The relay apparatus 200 operates as described below. Upon receiving a plurality of packets of the one message sequentially, the receiving unit 210 stores the packets in the queue 250. Out of the plurality of packets stored in the queue 250, the partial packet assembling unit 220 assembles a packet group including a head packet related to the one message up to a packet including, as a payload, user identification information in a header of the one message. The partial packet assembling unit 220 thus generates partial message data, and then outputs the generated partial message data to the user identifying unit 230.

The user identifying unit 230 then extracts the user identification information from the partial message data generated by the partial packet assembling unit 220, and identifies a user identifier from the user identification information. The user identification information itself may be used as the user identifier. The packet processor unit 240 performs a specific packet process, in accordance with the user identifier identified by the user identifying unit 230, on the packet group of the one message and a packet not assembled by the partial packet assembling unit 220 out of the plurality of packets.

The partial packet assembling unit 220 may perform the process on a copy of the data of the packet stored in the queue 250 or may perform the process by extracting the packet group from the head packet up to the packet including user identification information in the payload. In the latter case, the partial message data is partitioned into packets subsequent to the process of the user identifying unit 230 and is then processed by the packet processor unit 240.

Since only part of the plurality of packets forming the one message is handled as an assembly target, the workload on the relay apparatus 200 is reduced.

If a connection is made on a per user basis, the user remains unchanged until the connection is broken. If the above-described process is performed on a leading message, a packet assembly process on a subsequent message may be omitted. If a connection is shared by a plurality of users, the above-described process is performed on a per message basis. Since the entire message is not assembled, the workload is accordingly reduced.

Second Embodiment

Figure 3:
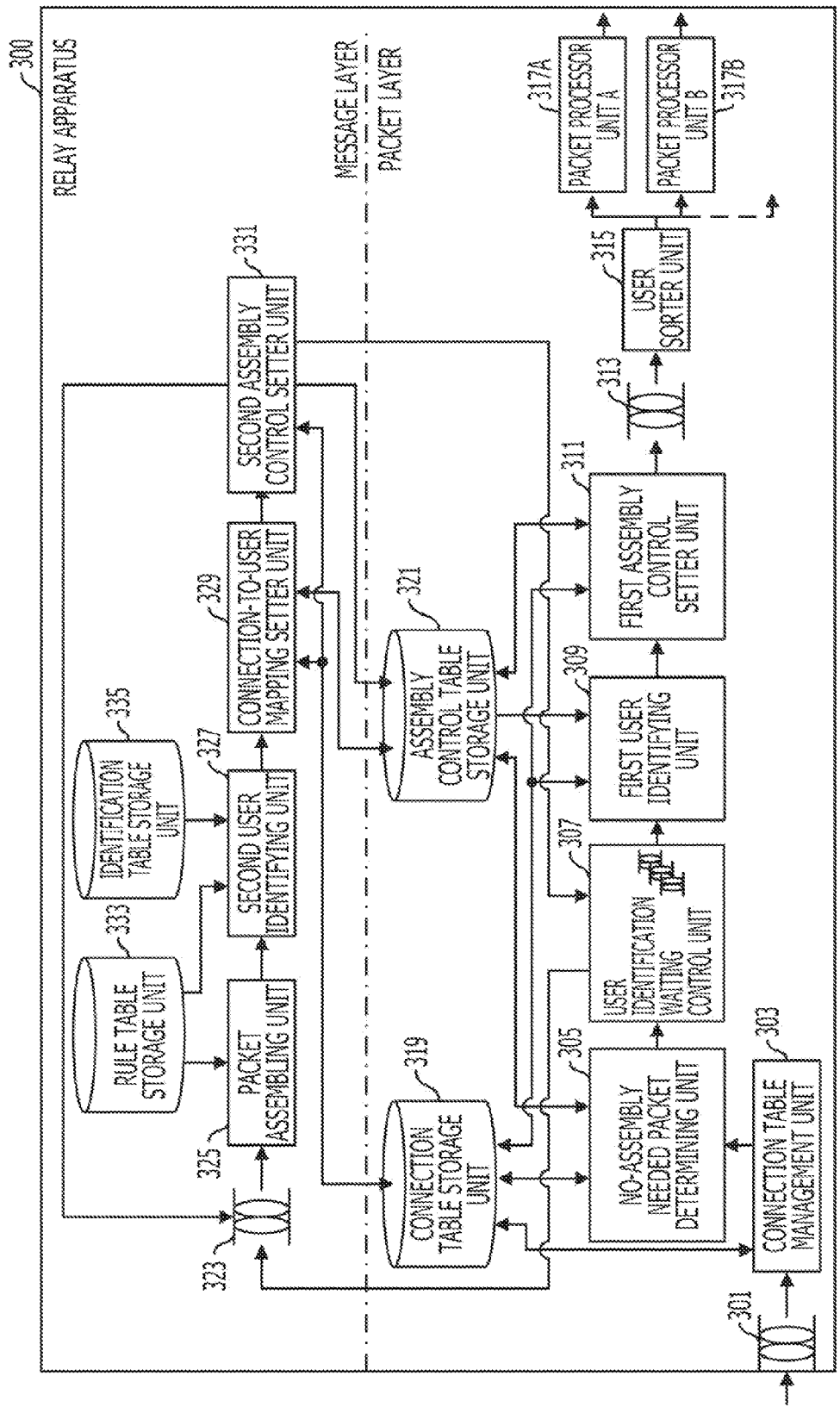
FIG. 3 is a functional block diagram illustrating a relay apparatus of a second embodiment.

FIG. 3 is a functional block diagram illustrating a relay apparatus 300 of a second embodiment of the technique described herein. The relay apparatus 300 includes, as elements of a packet layer, queue 301, connection table management unit 303, no-assembly needed packet determining unit 305, user identification waiting control unit 307, first user identifying unit 309, first assembly control setter unit 311, queue 313, user sorter unit 315, packet processor unit A (317A), packet processor unit B (317B), connection table storage unit 319, and assembly control table storage unit 321. The packet processor unit 317 performs the process thereof for each user, and the number of packet processor units 317 is not limited to two.

The relay apparatus 300 further includes, as elements of a message layer, queue 323, packet assembling unit 325, second user identifying unit 327, connection-to-user mapping setter unit 329, second assembly control setter unit 331, rule table storage unit 333, and identification table storage unit 335.

The packets received by the relay apparatus 300 are sequentially stored in the queue 301. The connection table management unit 303 extracts the data of the packets from the queue 301 sequentially, updates the connection table storage unit 319 as necessary, and outputs the data of the packet extracted from the queue 301 to the no-assembly needed packet determining unit 305. The no-assembly needed packet determining unit 305 updates an assembly control table stored on the assembly control table storage unit 321 if necessary by referencing the connection table storage unit 319. The no-assembly needed packet determining unit 305 processes the data of the packet received from the connection table management unit 303, and outputs the processed data to the user identification waiting control unit 307. The user identification waiting control unit 307 receives the data of the packet from the no-assembly needed packet determining unit 305, and copies the data and stores the copied data in the queue 323 in the message layer. The user identification waiting control unit 307 stores the data in the queue thereof on a per connection basis.

In accordance with data stored on the rule table storage unit 333, the packet assembling unit 325 extracts the data of the packet stored in the queue 323, and performs the packet assembly process on the extracted data. The packet assembling unit 325 thus outputs the process results to the second user identifying unit 327. In accordance with data stored on the rule table storage unit 333 and the identification table storage unit 335, the second user identifying unit 327 performs the process thereof on the output data output from the packet assembling unit 325 and outputs the process results thereof to the connection-to-user mapping setter unit 329. In response to the output data from the second user identifying unit 327, the connection-to-user mapping setter unit 329 references the connection table storage unit 319, updates the assembly control table storage unit 321, and outputs the output data from the second user identifying unit 327 to the second assembly control setter unit 331. In response to the output data from the connection-to-user mapping setter unit 329, the second assembly control setter unit 331 references the connection table storage unit 319, updates the assembly control table storage unit 321, and outputs an instruction to the user identification waiting control unit 307.

In response to the instruction from the second assembly control setter unit 331, the user identification waiting control unit 307 outputs data of a packet within the queue thereof to the first user identifying unit 309. In response to the data of the received packet, the first user identifying unit 309 references the connection table storage unit 319 and the assembly control table storage unit 321, and sets a user identifier in the data of the packet. The first user identifying unit 309 then outputs the data of the packet to the first assembly control setter unit 311. If the data of the packet is to be referenced, the first assembly control setter unit 311 updates the connection table storage unit 319 and the assembly control table storage unit 321. The first assembly control setter unit 311 stores the data of the packet in the queue 313.

The user sorter unit 315 sequentially extracts the data of the packets stored in the queue 313, and outputs the data of the packets to the packet processor unit 317 responsive to the user identification information. The packet processor unit 317 performs a specific process on the data of the packet.

If the data of an unnecessary packet is stored in the queue 323, the second assembly control setter unit 331 instructs the data to be deleted.

The operation of the relay apparatus 300 of FIG. 3 is described in detail with reference to FIGS. 4-14. A packet receiver (not illustrated) in the relay apparatus 300 receives a packet from a device connected to the relay apparatus 300 and then stores the packet in the queue 301 (S1 in FIG. 4). The connection table management unit 303 reads the data of the packet from the queue 301 and performs a connection verification process on the packet (S3). More specifically, the connection table management unit 303 extracts, from a transmission control protocol (TCP) or a user datagram protocol (UDP)/internet protocol (IP) header, connection identification data, e.g., a transmission source IP address, a destination IP address, a transmission source port number, and a destination port number. The connection table management unit 303 then identifies a connection from the connection identification data. The connection table management unit 303 then searches a connection table of the connection table storage unit 319 according to the connection identification data. If no corresponding entry is hit, the connection table management unit 303 registers a new entry including the connection identification data. If a corresponding entry is hit, the connection table management unit 303 updates the corresponding entry in response to a packet as a process target. The connection table management unit 303 then outputs the data of the packet as a process target to the no-assembly needed packet determining unit 305.

An example of the connection table is illustrated in FIG. 5. As illustrated in FIG. 5, the connection table lists the transmission source IP address, the destination IP address, the transmission source port number, the destination port number, state management data related to a connection state, such as TCP sequence number, connection making in progress, and a link (such as an entry number or a pointer) to a corresponding entry in the assembly control table. The state management data is updated even when the entry is present.

Upon receiving the data of the packet as a process target, the no-assembly needed packet determining unit 305 extracts the connection identification data from the header of the packet, searches the connection table in the connection table storage unit 319 according to the connection identification data, and determines whether the corresponding entry is present in the assembly control table depending on the presence or absence of a link to the entry in the assembly control table in the assembly control table storage unit 321 (S5). If no corresponding entry is present in the assembly control table, the no-assembly needed packet determining unit 305 registers in the assembly control table the entry corresponding to the connection identification data (S7), and then registers the link to the entry in the connection table of the connection table storage unit 319 with the link mapped to the connection identification data. Processing proceeds to S9.

FIG. 6 illustrates an example of the assembly control table. As illustrated in FIG. 6, the assembly control table lists an assembly flag and a user identifier. In S7, the assembly flag is set to "true," and the user identifier is set to empty "-". If the assembly flag is "true," the data of the packet is output to the message layer, and if the assembly flag is "false," the packet layer is a working layer. Referring to FIGS. 5 and 6, the mapping of the entry is registered at the same row, and has the same row number "#." The connection identification data may be registered in the assembly control table.

Subsequent to S7, or if the corresponding entry is present in the assembly control table, the no-assembly needed packet determining unit 305 attaches control data to the data of the packet as the process target, and outputs the packet data with the control data to the user identification waiting control unit 307 (S9).

Figure 7:
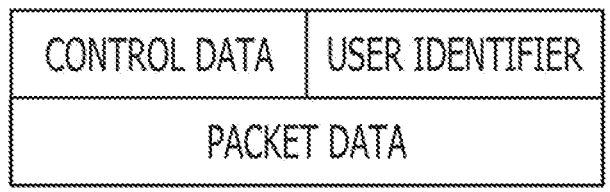
FIG. 7 illustrates an format example of packet data with control data.

The packet data with the control data looks like the data illustrated in FIG. 7. As illustrated in FIG. 7, the packet data with the control data includes the control data including the user identifier and the data of the packet (e.g., the header and the payload). Nothing is set for the user identifier at default.

Upon receiving the packet data with the control data, the user identification waiting control unit 307 extracts the connection identification data from the data of the packet, identifies the corresponding entry in the connection table, reads an entry from the assembly control table, mapped to the entry, and then determines whether the assembly flag is "true" (assembly needed) (S11). If the assembly flag is "false," processing proceeds to a process of FIG. 14 via a point A.

If the assembly flag is "true," the user identification waiting control unit 307 copies the packet data with the control data and then outputs the packet data with the control data to the message layer (S13). More specifically, the packet data with the control data is registered in the queue 323 of the message layer. The user identification waiting control unit 307 further registers the packet data with the control data in the queue thereof on a per connection basis and waits on standby for queue unblocking (S15).

If the packet data with the control data is registered in the queue 323, a message layer process is to be executed (S14). The message layer process is described below with reference to FIGS. 8-12.

Figure 8:
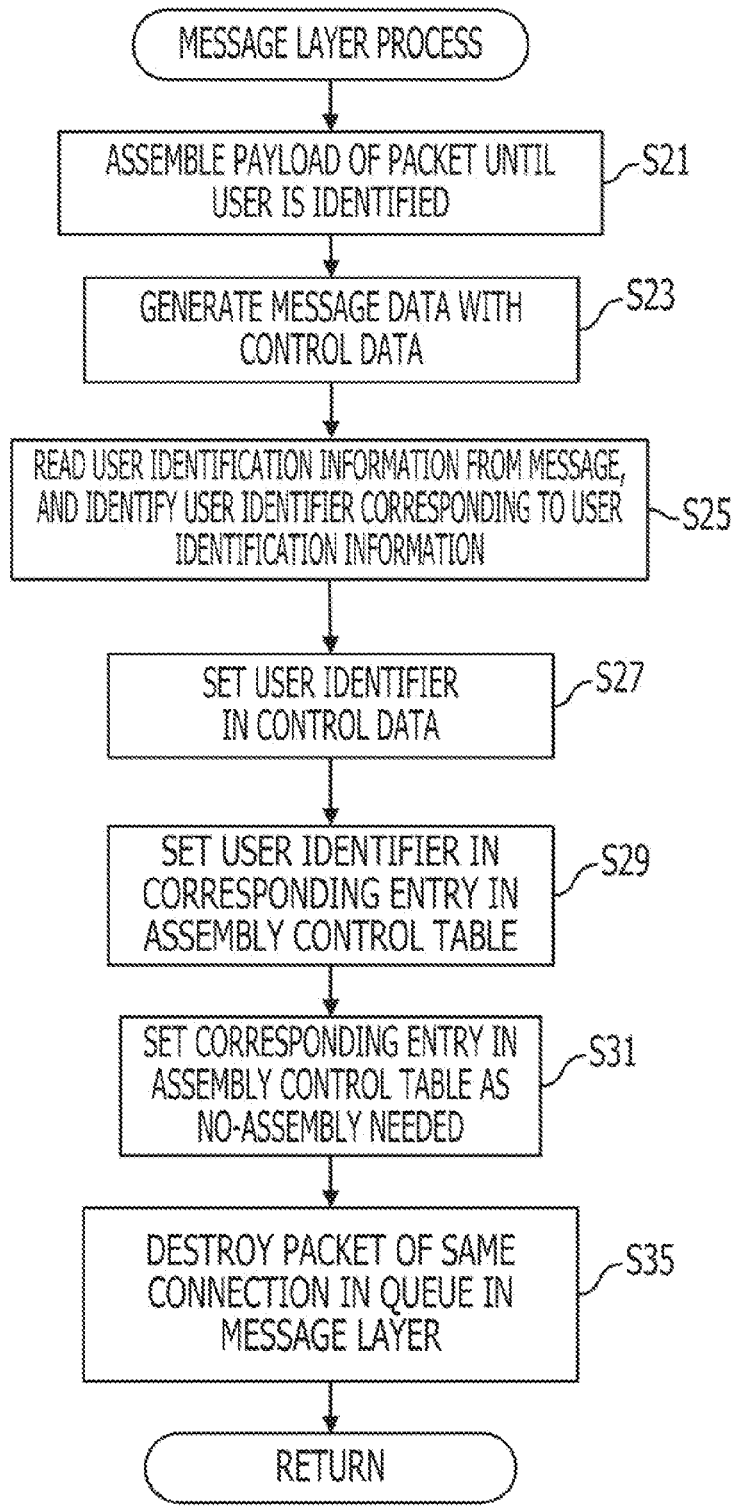
FIG. 8 is a flowchart illustrating a message layer process of the second embodiment.

The packet assembling unit 325 extracts, from the queue 323, the packet data with the control data which is from a head packet of the message up to a packet including the user identification information, removes the packet header from the extracted data, assembles the payload of the packets, and then stores the packets onto a memory (S21 in FIG. 8). In this operation, the packet assembling unit 325 uses an assembly setting table stored on the rule table storage unit 333.

FIG. 9 illustrates an example of the assembly setting table. Registered in the assembly setting table in FIG. 9 are a key that is identified by one of the destination IP address, the destination port number, and the destination uniform resource identifier (URI), and an assembly setting corresponding to the key. The assembly setting refers to data indicating which one of the packets the assembling is performed up to, to identify a user. According to HTTP, the assembling is performed up to H7 header (until /r/n/r/n is received), or until 16 packets are assembled. As illustrated in FIG. 9, the packet up to which the assembling is performed is set on a per destination port number basis. If the destination port number is 80, packets are assembled until the whole HTTP header is acquired. If the destination port number is 5060, the whole session initiation protocol (SIP) header is acquired. The key may include a destination interface (I/F) (destination port).

The packet assembling unit 325 identifies the corresponding entry in the assembly setting table based on the connection identification data identified by the header of the packet. In response to the assembly setting of the corresponding entry, the packet assembling unit 325 reads from the queue 323 the packet data with the control data of the packet that becomes necessary.

Using part of the assembled message, the packet assembling unit 325 generates the message data with the control data and stores the message data with the control data on the memory thereof (S23). The message data with the control data has a data format illustrated in FIG. 10. The data format of FIG. 10 includes the control data including the user identifier, partial message data as part of the message data assembled in S21, and the header of the packet used in the assembling. At this point, the user identifier is not identified and is thus blank. Upon generating the message data with the control data, the packet assembling unit 325 outputs the message data with the control data to the second user identifying unit 327.

In response to an identification rule table stored on the rule table storage unit 333, the second user identifying unit 327 extracts the user identification information from the partial message data included in the message data with the control data received from the packet assembling unit 325, and searches an identification table stored on the identification table storage unit 335 to identify the corresponding user identifier (S25).

FIG. 11 illustrates an example of the identification rule table. Registered in the identification rule table in FIG. 11 are a key that is identified by at least one of the destination IP address, the destination port number, and the destination URI, and an identification information storage location corresponding to the key. The identification information storage location indicates which message header the user identification information is written on, and is indicated by Xpath or in regular expression. The identification information storage location is typically common to all the users. As illustrated in FIG. 11, a different value may be set for the identification information storage location on a different destination. The second user identifying unit 327 extracts, as the user identification information, part of the URL included in the header of HTTP.

FIG. 12 illustrates an example of the identification table. Listed in the identification table of FIG. 12 is the user identifier within the relay apparatus 300 with the user identification information mapped thereto. If the identification table is searched with the user identification information extracted from the identification rule table, the corresponding user identifier is identified.

The second user identifying unit 327 sets in the control data the user identifier identified in S25, and outputs the message data with the control data to the connection-to-user mapping setter unit 329 (S27).

The connection-to-user mapping setter unit 329 extracts the connection identification data (the transmission source IP address, the destination IP address, the transmission source port number, and the destination port number) from the packet header included in the received message data with the control data, identifies the corresponding entry in the assembly control table by searching the connection table according to the connection identification data, and sets the user identifier included in the control data into the entry (S29). The connection-to-user mapping setter unit 329 outputs the message data with the control data to the second assembly control setter unit 331.

Upon receiving the message data with the control data, the second assembly control setter unit 331 extracts the connection identification data from the packet header included in the message data with the control data, and searches the connection table to identify the mapped entry within the assembly control table, and sets the assembly flag of the entry as no-assembly needed (S31).

The second assembly control setter unit 331 destroys in the queue 323 the packet in the message layer from which the same connection identification data as the connection identification data identified in S31 is extracted (S35). In this way, the data of the packet copied and stored in the queue 323 in a redundant fashion is deleted. Although the process of the second assembly control setter unit 331 still continues, the discussion focuses on the main routine for convenience of explanation.

Figure 4:
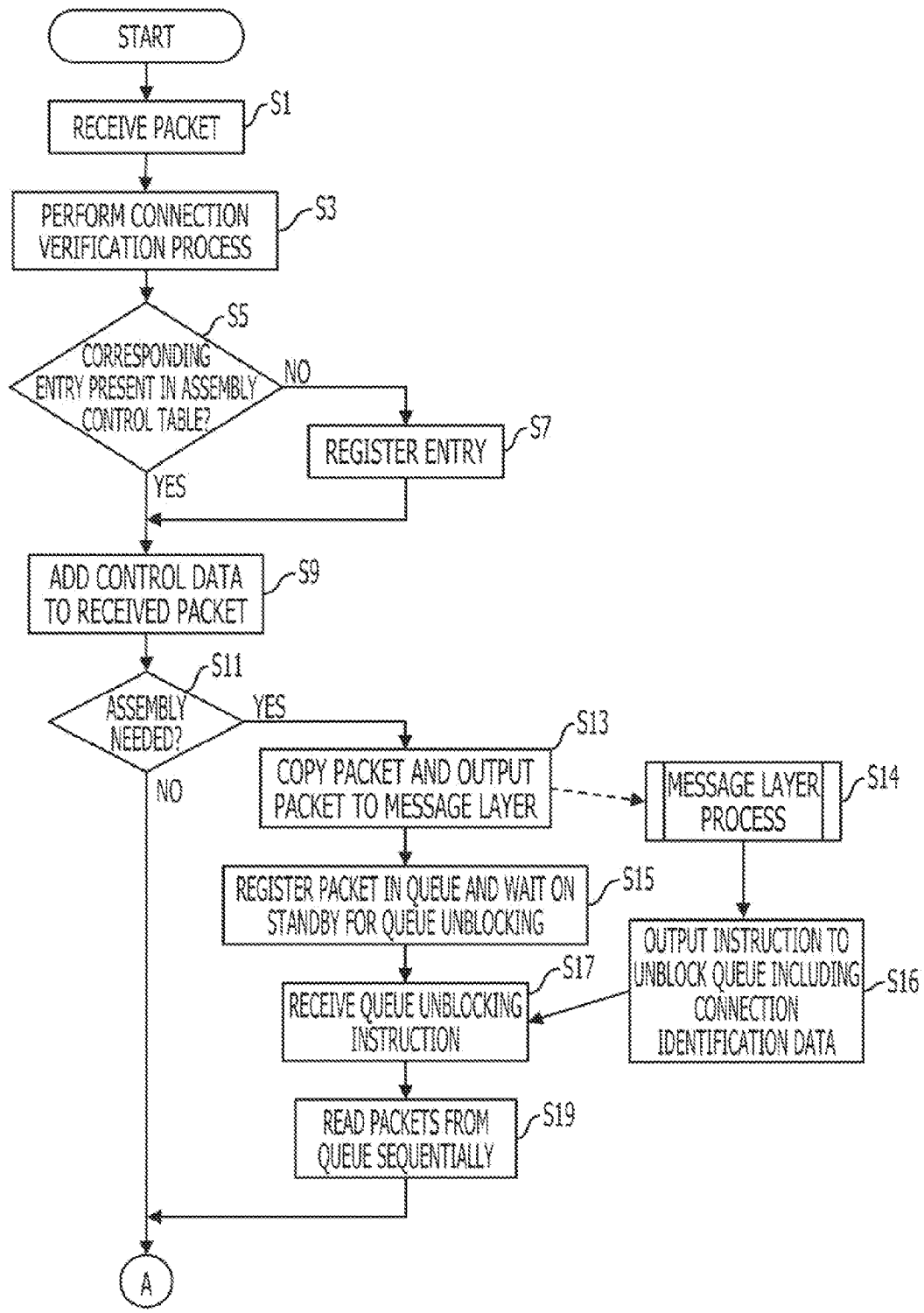
FIG. 4 is a flowchart illustrating a process of the second embodiment.
Figure 13:
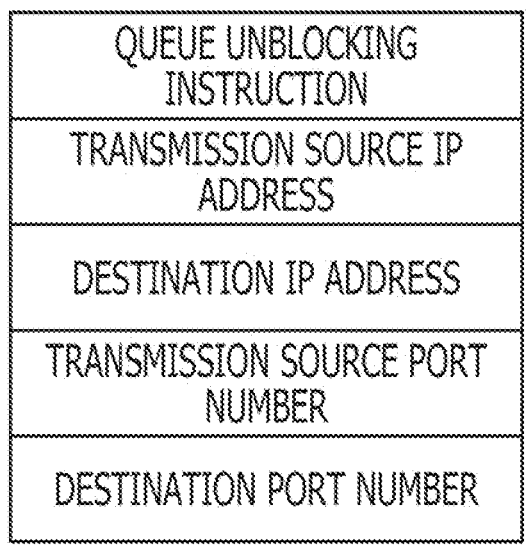
FIG. 13 illustrates an example of a data format of a queue unblocking instruction.

Returning to the discussion of the main routine of FIG. 4, the second assembly control setter unit 331 outputs to the user identification waiting control unit 307 a queue unblocking instruction including the connection identification data identified in S31 (S16). The second assembly control setter unit 331 outputs data illustrated in FIG. 13. As illustrated in FIG. 13, the output data includes a queue unblocking instruction, a transmission source IP address, a destination IP address, a transmission source port number, and a destination port number. Upon receiving the queue unblocking instruction including the connection identification data (S17), the user identification waiting control unit 307 sequentially reads the data of the packets in the queue of the connection identified by the connection identification data and outputs the packet data to the first user identifying unit 309 (S19). Processing proceeds to the process of FIG. 14 via the point A in FIG. 4.

Figure 14:
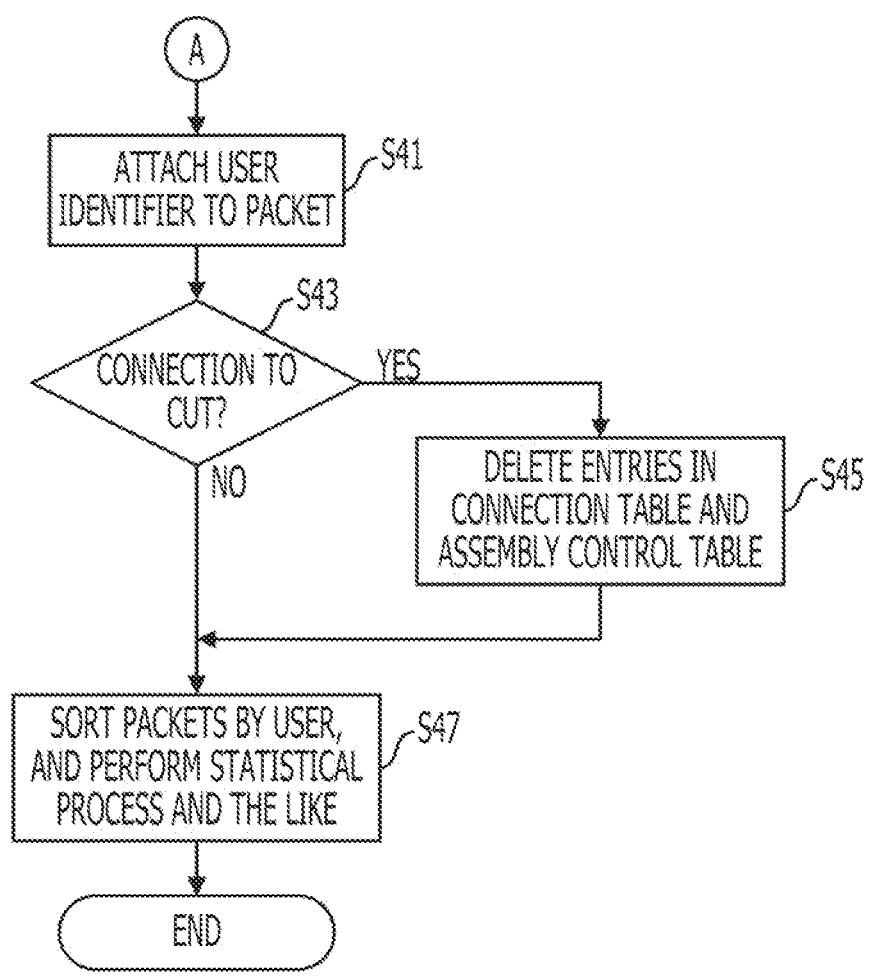
FIG. 14 is a flowchart illustrating a process of the second embodiment.

As illustrated in FIG. 14, the first user identifying unit 309 receives the packet data with the control data. The first user identifying unit 309 then extracts the connection identification data from the packet data, and searches the connection table to identify the mapped entry in the assembly control table. The first user identifying unit 309 reads the user identifier of the entry, attaches the user identifier to the control data of the packet data with the control data, and then outputs the packet data with the control data with the user identifier attached thereto to the first assembly control setter unit 311 (S41).

Upon receiving the packet data with the control data, the first assembly control setter unit 311 determines based on the header of the packet data whether the packet is a packet for connection breaking such as a FIN packet in TCP (S43). If the packet is a packet for connection breaking, the first assembly control setter unit 311 extracts the connection identification data from the packet data, searches the connection table according to the connection identification data to identify the corresponding entry, identifies a mapped entry in the assembly control table, and then deletes these entries (S45). Processing proceeds to operation S47.

Subsequent to S45 or if the packet as the process target is not a packet for connection breaking, the first assembly control setter unit 311 stores the received packet data with the control data in the queue 313.

The user sorter unit 315 sequentially reads the packet data with the control data stored in the queue 313, identifies the packet processor unit 317 responsive to the packet of the user identifier in response to the user identifier of the control data, and outputs the packet data with the control data to the packet processor unit 317. Upon receiving the packet data with the control data, the packet processor unit 317 performs a filtering process, a statistic process, and a log recording process (S47). As discussed above, the process of the packet processor unit 317 remains unchanged from related art, and no further discussion is provided. Subsequent to the process of the packet processor unit 317, the data of the packet with the control data thereof removed is output to a port connected to the destination of that packet if no filtering process is performed.

Through the above-described process, the user identifier is identified by simply assembling part of the packets related to first message from the connection making to the connection breaking. The workload in the message layer is substantially reduced.

The embodiment described above is based on the premise that one connection is made for one user. In practice, a plurality of users may be present for one connection. If a plurality of users are present for one connection, the user identifier is identified on a per message basis. However, the arrangement of a plurality of users for one connection remains unchanged from the above-described embodiment in that not the whole message is assembled. Packets are assembled until the user identification information and message length are extracted. If the message length is extracted from the header of the message, a message border is identified. At a message border, packets for the next message are assembled. If the user identifier is identified on a per message basis, part of the packets of the message is not assembled. The workload is thus reduced.

Third Embodiment

Figure 15:
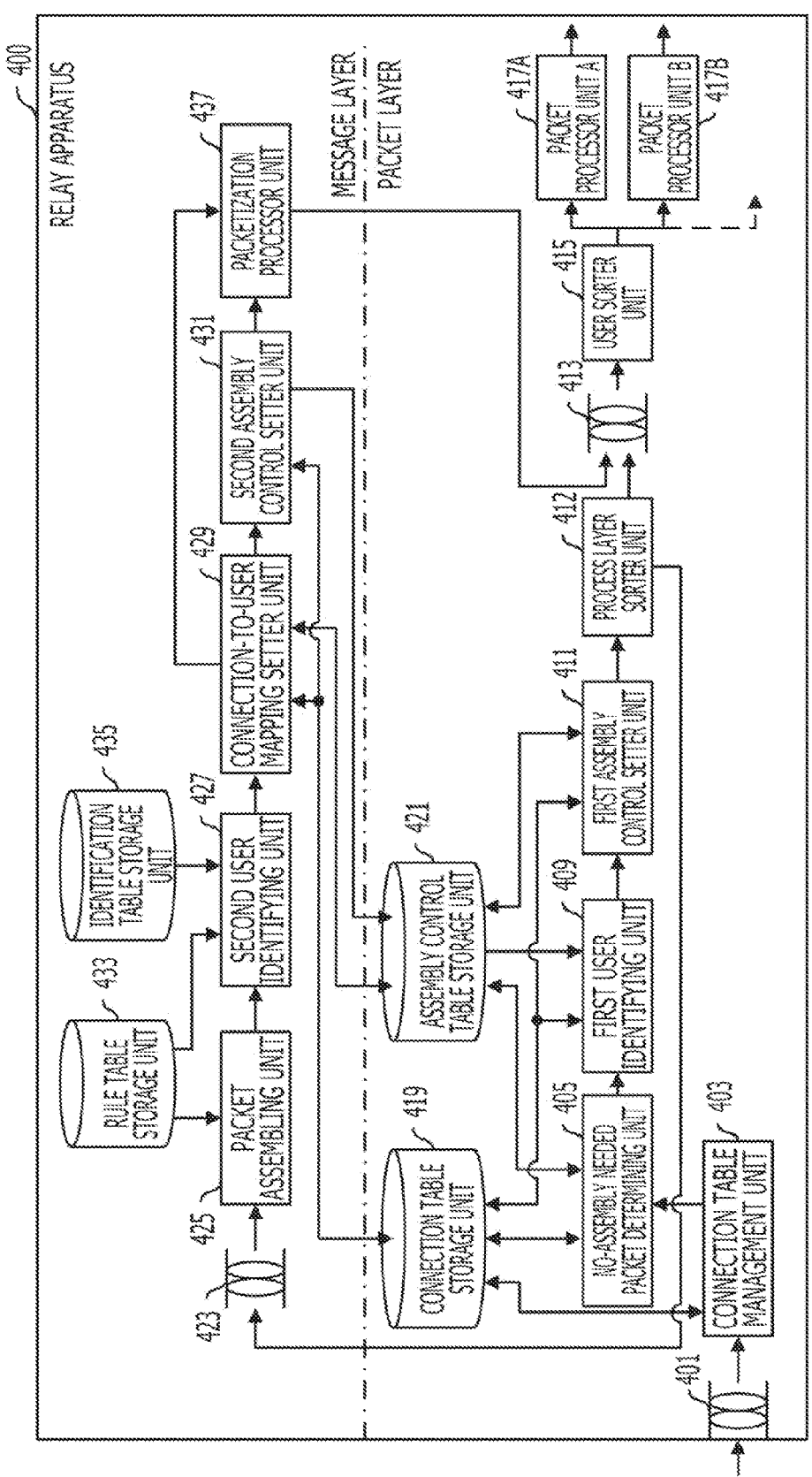
FIG. 15 is a functional block diagram illustrating a relay apparatus of the third embodiment.
Figure 16:
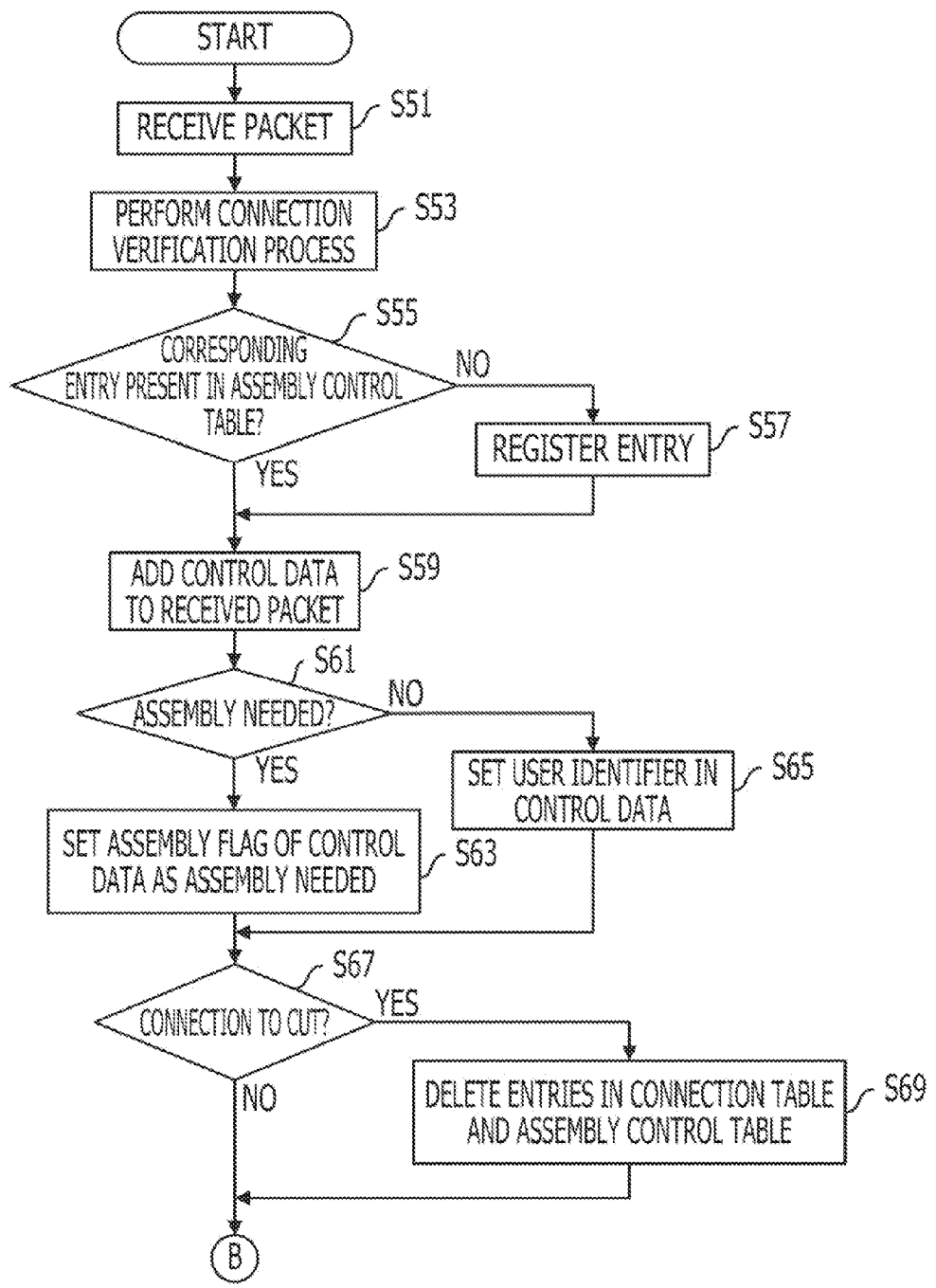
FIG. 16 is a flowchart illustrating a process of the third embodiment.

FIG. 15 is a functional block diagram illustrating a relay apparatus 400 of a third embodiment. The relay apparatus 400 includes, as elements of a packet layer, queue 401, connection table management unit 403, no-assembly needed packet determining unit 405, first user identifying unit 409, first assembly control setter unit 411, process layer sorter unit 412, queue 413, user sorter unit 415, packet processor unit A (417A), packet processor unit B (417B), connection table storage unit 419, and assembly control table storage unit 421. The packet processor unit 417 performs the process thereof for each user, and the number of packet processor units 417 is not limited to two.

The relay apparatus 400 further includes, as elements of a message layer, queue 423, packet assembling unit 425, second user identifying unit 427, connection-to-user mapping setter unit 429, second assembly control setter unit 431, rule table storage unit 433, identification table storage unit 435, and packetization processor unit 437.

The packets received by the relay apparatus 400 are sequentially stored in the queue 401. The connection table management unit 403 extracts the data of the packets from the queue 401 sequentially, updates the connection table storage unit 419 as necessary, and outputs the data of the packet extracted from the queue 401 to the no-assembly needed packet determining unit 405. The no-assembly needed packet determining unit 405 updates an assembly control table stored on the assembly control table storage unit 421 if necessary by referencing the connection table storage unit 419. The no-assembly needed packet determining unit 405 processes the data of the packet received from the connection table management unit 403, and outputs the processed data to the first user identifying unit 409. If the entry in the assembly control table is set as assembly needed ("true"), the no-assembly needed packet determining unit 405 sets the assembly flag of the data of the packet to be assembly needed. In other case, no-assembly needed or nothing is set in the assembly flag.

The first user identifying unit 409 references the connection table storage unit 419 and the assembly control table storage unit 421. If the user identifier is identified, the first user identifying unit 409 adds the user identifier to the data of the packet, and outputs the data of the packet to the first assembly control setter unit 411. The first assembly control setter unit 411 references the data of the packet, and if necessary, updates the connection table storage unit 419 and the assembly control table storage unit 421. The first assembly control setter unit 411 outputs the data of the packet to the process layer sorter unit 412. The process layer sorter unit 412 checks the assembly flag included in the data of the packet, and stores the data of the packet in the queue 423 in the message layer if the assembly flag indicates assembly is needed. The process layer sorter unit 412 stores the data of the packet in the queue 413 if the assembly flag indicates no-assembly needed.

In accordance with data stored on the rule table storage unit 433, the packet assembling unit 425 extracts the data of the packet stored in the queue 423, and performs the packet assembly process on the extracted data. The packet assembling unit 425 thus outputs the process results to the second user identifying unit 427. In accordance with data stored on the rule table storage unit 433 and the identification table storage unit 435, the second user identifying unit 427 performs the process thereof on the output data output from the packet assembling unit 425 and outputs the process results thereof to the connection-to-user mapping setter unit 429. In response to the output data from the second user identifying unit 427, the connection-to-user mapping setter unit 429 references the connection table storage unit 419, updates the assembly control table storage unit 421, and outputs the output data from the second user identifying unit 427 to the second assembly control setter unit 431. In response to the output data from the connection-to-user mapping setter unit 429, the second assembly control setter unit 431 references the connection table storage unit 419, updates the assembly control table storage unit 421, and provides the output thereof to the packetization processor unit 437. The packetization processor unit 437 partitions the data of the message into data of packets, and then outputs the data of the packets to the queue 413. The packet assembling unit 425 and the connection-to-user mapping setter unit 429 process the data in the queue 423 storing the no-assemble needed packets. The connection-to-user mapping setter unit 429 outputs the process results thereof to the packetization processor unit 437.

The user sorter unit 415 sequentially extracts the data of the packets stored in the queue 413, and outputs the data of the packets to the packet processor unit 417 responsive to the user identification information. The packet processor unit 417 performs a specific process on the data of the packet.

The operation of the relay apparatus 400 is described in detail with reference to FIGS. 16-20. A packet receiver (not illustrated) in the relay apparatus 400 receives a packet from a device connected to the relay apparatus 400 and then stores the packet in the queue 401 (S51 in FIG. 16). The connection table management unit 403 reads the data of the packet from the queue 401 and performs a connection verification process on the packet (S53). More specifically, the connection table management unit 403 extracts, from a transmission control protocol (TCP) or a user datagram protocol (UDP)/internet protocol (IP) header, connection identification data, e.g., a transmission source IP address, a destination IP address, a transmission source port number, and a destination port number. The connection table management unit 403 then identifies a connection from the connection identification data. The connection table management unit 403 then searches a connection table of the connection table storage unit 419 according to the connection identification data. If no corresponding entry is found, the connection table management unit 403 registers a new entry including the connection identification data. If a corresponding entry is found, the connection table management unit 403 updates the corresponding entry in response to a packet as a process target. The connection table management unit 403 then outputs the data of the packet as a process target to the no-assembly needed packet determining unit 405. The connection table may be like the table of FIG. 5 in the second embodiment.

Upon receiving the data of the packet as a process target, the no-assembly needed packet determining unit 405 extracts the connection identification data from the header of the packet, searches the connection table in the connection table storage unit 419 according to the connection identification data, and determines whether the entry is present in the assembly control table depending on the presence or absence of a link to the entry in the assembly control table in the assembly control table storage unit 421 (S55). If no corresponding entry is present in the assembly control table, the no-assembly needed packet determining unit 405 registers in the assembly control table the entry corresponding to the connection identification data (S57), and then registers the link to the entry in the connection table of the connection table storage unit 419 with the link mapped to the connection identification data. Processing proceeds to S59. The assembly control table may be like the table illustrated in FIG. 6 in the second embodiment. The assembly flag is set to "true" at default. Nothing is set for the user identifier at this point of time.

Subsequent to S57, or if the corresponding entry is present in the assembly control table, the no-assembly needed packet determining unit 405 attaches control data to the data of the packet as the process target (S59).

Figure 17:
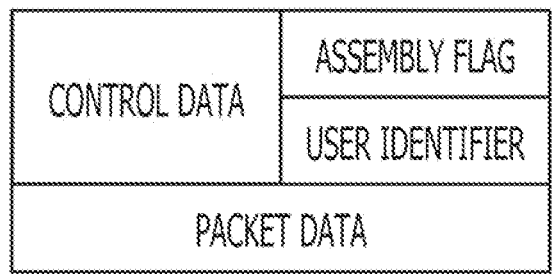
FIG. 17 illustrates a format example of the packet data with the control data of the third embodiment.

FIG. 17 illustrates the packet data with the control data of the embodiment. As illustrated in FIG. 17, the packet data with the control data includes the control data including the user identifier and the assembly flag, and the data of the packet (e.g., the header and the payload). Nothing is set for the assembly flag and the user identifier at default.

The no-assembly needed packet determining unit 405 determines whether the assembly flag of the entry in the assembly control table mapped to the connection identification data extracted from the header of the packet as the process target is "true" (assembly needed) (S61). If the assembly flag of the entry of the assembly control table is "true," the no-assembly needed packet determining unit 405 sets the assembly flag of the control data to be assembly needed, and outputs the assembly flag to the first user identifying unit 409 (S63). Subsequent to S63, e.g., if the assembly flag of assembly needed is included in the control data, the first user identifying unit 409 outputs the packet data with the control data as is to the first assembly control setter unit 411.

If the assembly flag of the entry in the assembly control table is "false," the user identifier is already registered in the entry of the assembly control table. The no-assembly needed packet determining unit 405 thus outputs the packet data with the control data to the first user identifying unit 409. The assembly flag of the control data may be set to be no-assembly needed. Upon receiving the packet data with the control data, the first user identifying unit 409 extracts the connection identification data from the header of the packet, searches the connection table according to the connection identification data, reads the user identifier of the entry in the assembly control table mapped to the entry, and sets the user identifier in the entry (S65). The first user identifying unit 409 outputs the packet data with the control data to the first assembly control setter unit 411.

Subsequent to one of S63 and S65, the first assembly control setter unit 411 determines based on the header of the packet data whether the packet is a packet for connection breaking such as a FIN packet in TCP in response to the reception of the packet data with the control data (S67). If the packet is a packet for connection breaking, the first assembly control setter unit 411 extracts the connection identification data from the packet data, searches the connection table according to the connection identification data to identify the corresponding entry, identifies an entry in the assembly control table mapped thereto, and then deletes these entries (S69). The first assembly control setter unit 411 outputs the packet data with the control data to the process layer sorter unit 412. Processing proceeds to a process of FIG. 18 via a point B. Even if the packet is not a packet for connection breaking, the first assembly control setter unit 411 outputs the packet data with the control data to the process layer sorter unit 412. Processing proceeds to the process of FIG. 18 via the point B in FIG. 16.

Figure 18:
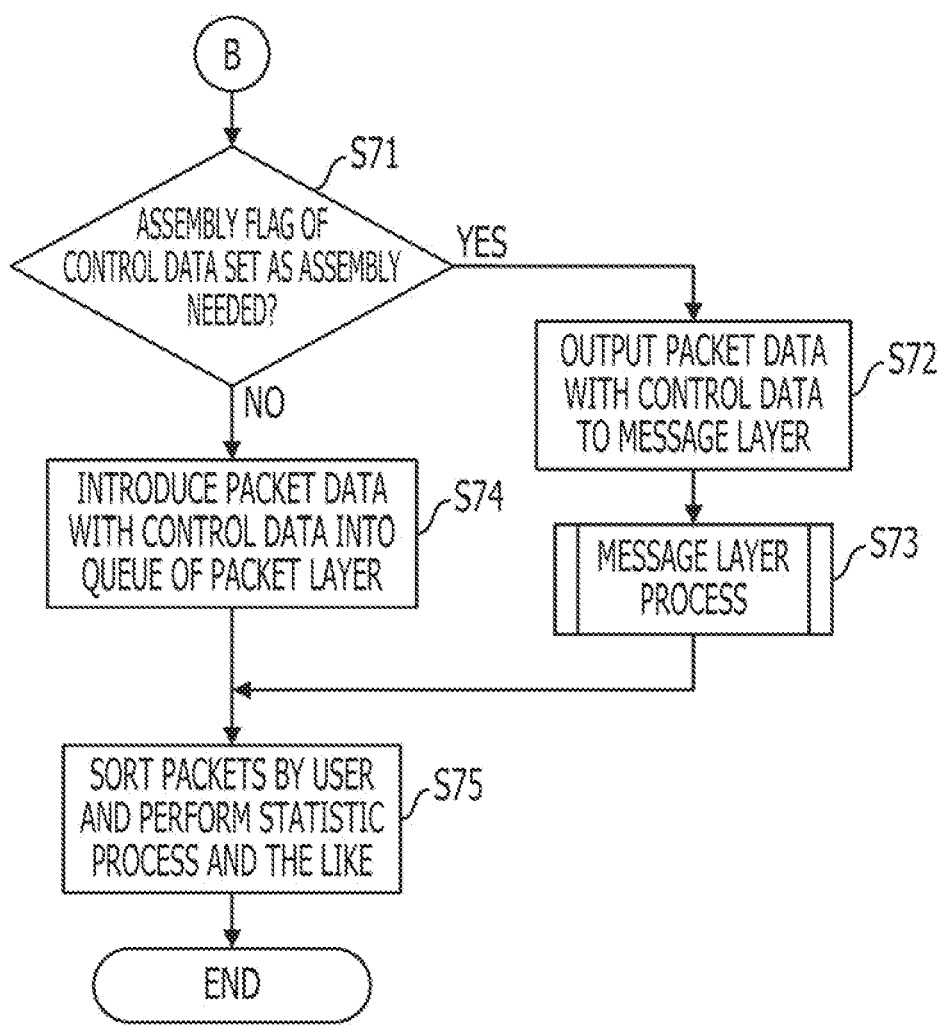
FIG. 18 is a flowchart illustrating the process of the third embodiment.

With reference to FIG. 18, the process layer sorter unit 412 determines whether the assembly flag included in the control data of the received packet data with the control data is set to be assembly needed (S71). If the assembly flag included in the control data of the received packet data with the control data is set to be assembly needed, the process layer sorter unit 412 stores the packet data with the control data in the queue 423 in the message layer (S72). A message layer process is then performed (S73). If the assembly flag included in the control data is set to be no-assembly needed or empty, the process layer sorter unit 412 stores the packet data with the control data into the queue 413 in the packet layer (S74). Since the user identifier is already set in the control data, no assembly is needed.

The message layer process of the embodiment is described below with reference to FIGS. 19 and 20.

Figure 19:
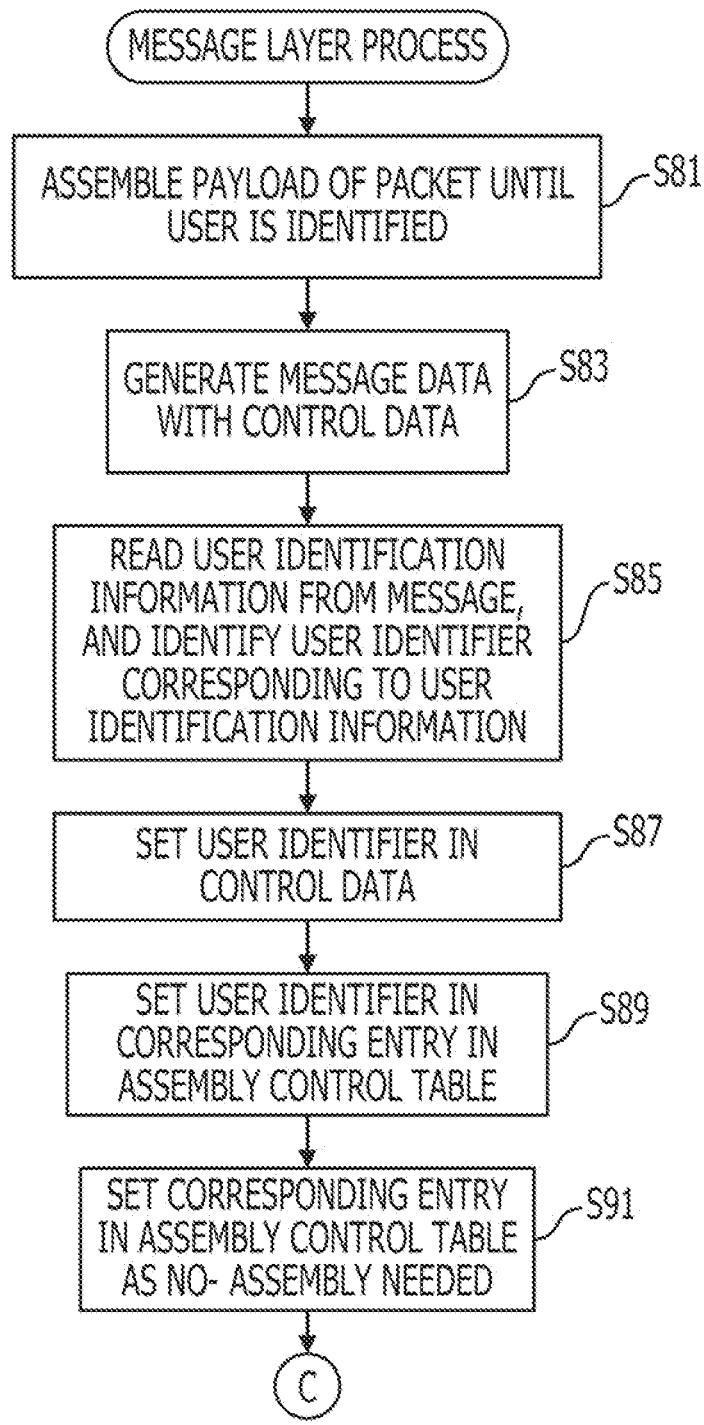
FIG. 19 is a flowchart illustrating a message layer process of the third embodiment.

The packet assembling unit 425 extracts, from the queue 423, the packet data with the control data which is from a head packet of the message up to a packet including the user identification information, removes the packet header from the extracted data, assembles the payloads of the packets, and then stores the packets onto a memory (S81 in FIG. 19). In this operation, the packet assembling unit 425 uses an assembly setting table stored on the rule table storage unit 433. The assembly setting table may be like the table of FIG. 9 in the second embodiment.

The packet assembling unit 425 identifies the corresponding entry in the assembly setting table based on the connection identification data identified by the header of the packet. In response to the assembly setting of the corresponding entry, the packet assembling unit 425 reads from the queue 423 the packet data with the control data of the packet that becomes necessary.

Using part of the assembled message, the packet assembling unit 425 generates the message data with the control data and stores the message data with the control data on the memory thereof (S83). The message data with the control data may have the data format illustrated in FIG. 10 in the second embodiment. Upon generating the message data with the control data, the packet assembling unit 425 outputs the message data with the control data to the second user identifying unit 427.

In response to an identification rule table stored on the rule table storage unit 433, the second user identifying unit 427 extracts the user identification information from the partial message data included in the message data with the control data received from the packet assembling unit 425, and searches an identification table stored on the identification table storage unit 435 to identify the corresponding user identifier (S85). The identification rule table may be like the table of FIG. 11 in the second embodiment. For example, the second user identifying unit 427 extracts, as the user identification information, part of the URL included in the header of the HTTP message. The identification table may be like the table of FIG. 12 in the second embodiment.

The second user identifying unit 427 sets in the control data the user identifier identified in S85, and outputs the message data with the control data to the connection-to-user mapping setter unit 429 (S87).

The connection-to-user mapping setter unit 429 extracts the connection identification data (the transmission source IP address, the destination IP address, the transmission source port number, and the destination port number) from the packet header included in the message data with the control data, identifies the corresponding entry in the assembly control table by searching the connection table, and sets the user identifier included in the control data into the entry (S89). The connection-to-user mapping setter unit 429 outputs the message data with the control data to the second assembly control setter unit 431.

Upon receiving the message data with the control data, the second assembly control setter unit 431 extracts the connection identification data from the packet header included in the message data with the control data, and searches the connection table to identify the mapped entry within the assembly control table, and thus sets the assembly flag of the entry as no-assembly needed ("false") (S91). The second assembly control setter unit 431 outputs the message data with the control data to the packetization processor unit 437. Processing proceeds to a process of FIG. 20 via a point C.

Figure 20:
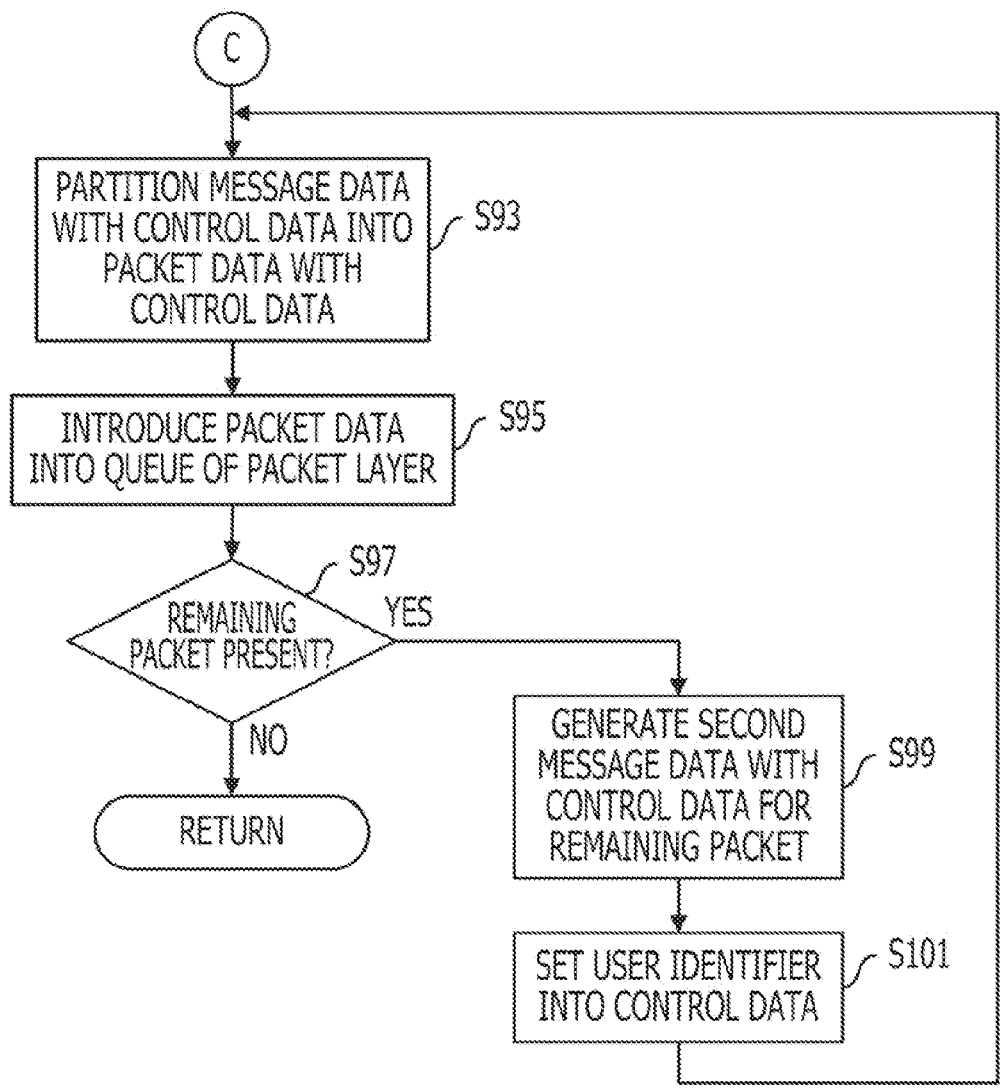
FIG. 20 is a continuation of the flowchart of FIG. 19.

With reference to FIG. 20, the packetization processor unit 437 partitions the received message data with the control data into the packet data with the control data (S93), and introduces the packet data with the control data into the queue 413 in the packet layer (S95). In a packetization process, a packet header is extracted from the message data with the control data, the message is partitioned and a partitioned message is attached to each packet header. The user identifier included in the control data of the message is also set in the control data of the packet. The assembly flag may be set to be empty or assembly needed. In this way, even if the data of the packet is output to the message layer without being copied, the packet data with the control data having the user identifier set therewithin is stored in the queue 413, and the packet process is performed.

A packet subsequent to a packet including as a payload the user identification information may be stored in the queue 413 depending on the timing of the packet reception and the throughput of the packet assembly process. In such a case, the following process is to be performed. The packet assembling unit 425 determines whether a remaining packet is present in the queue 423 (S97). If no remaining packet is present, the process of the message layer is complete. Processing thus returns to the main routine. If a remaining packet is present, the packet assembling unit 425 reads from the queue 413 the packet data with the control data of the remaining packet, generates second message data with the control data by performing the packet assembly process, and outputs the second message data with the control data to the second user identifying unit 427 (S99). Although the format of the second message data with control data may be similar to the format of FIG. 10, the second message data with the control data may include a flag different from the flag of the standard message data with the control data. The packet to be assembled dose not have the limitation such as the packets up to the packet including the user identification information in the payload.

Upon receiving the second message data with the control data, the second user identifying unit 427 outputs the second message data with the control data as is to the connection-to-user mapping setter unit 429. The connection-to-user mapping setter unit 429 receives the second message data with the control data, extracts the connection identification data from the packet header, and searches the connection table according to the connection identification data to identify the entry of the assembly control table. The connection-to-user mapping setter unit 429 reads the user identifier from the entry, and sets the user identifier in the control data (S101). The connection-to-user mapping setter unit 429 outputs the second message data with the control data to the packetization processor unit 437. Processing returns to S93.

Even if more than necessary packet data is output to the message layer, the data of the packets is appropriately returned to the packet layer. S99 and S101 have been described for exemplary purposes only. In one embodiment, the packet assembling unit 425 may read the user identifier from the assembly control table, set the user identifier in the control data, and then return the control data to the queue 413 in the packet layer. In another embodiment, the packet assembling unit 425 may set the assembly flag of the control data to be no-assembly needed, and then output the control data to the first user identifying unit 409.

Subsequent to S74 or the message layer process in FIG. 18, the user sorter unit 415 sequentially reads the packet data with the control data stored on the queue 413, identifies the packet processor unit 417 responsive to the packet of the user identifier based on the user identifier of the control data, and then outputs the packet data with the control data to the packet processor unit 417. Upon receiving the packet data with the control data, the packet processor unit 417 performs a filtering process, a statistic process, a log recording process, and the like (S75). As described above, the process of the packet processor unit 417 remains unchanged from the related art process, and is not discussed any further. Subsequent to the process of the packet processor unit 417, the data of the packet with the control data thereof removed is output to the port connected to the destination of the packet if the filtering process is not performed.

Through the above-described process, the user identifier may be identified by simply assembling a part of the packets related to the first message. The workload in the message layer is substantially reduced.

The embodiment described above is based on the premise that one connection is made for one user. In practice, a plurality of users may be present for one connection. If a plurality of users are present for one connection, the user identifier is identified on a per message basis. However, the arrangement of a plurality of users for one connection remains unchanged from the above-described embodiment in that the whole message is not assembled. Packets are assembled until the user identification information and message length are extracted. If the message length is extracted from the header of the message, a message border is identified. At a message border, packets for the next message are assembled. If the user identifier is identified on a per message basis, part of the packets of the message is not assembled. The workload is thus reduced.

Fourth Embodiment

According to the first embodiment, the packet process is performed with the queue unblocking instruction received in S17 and the packets sequentially read from the queue in S19. If the packet reading is slow, a subsequent packet may be output for the packet process, not by way of the queue in the user identification waiting control unit 307. In other words, the order of the packet process may be different from the order of packet reception.

Figure 21:
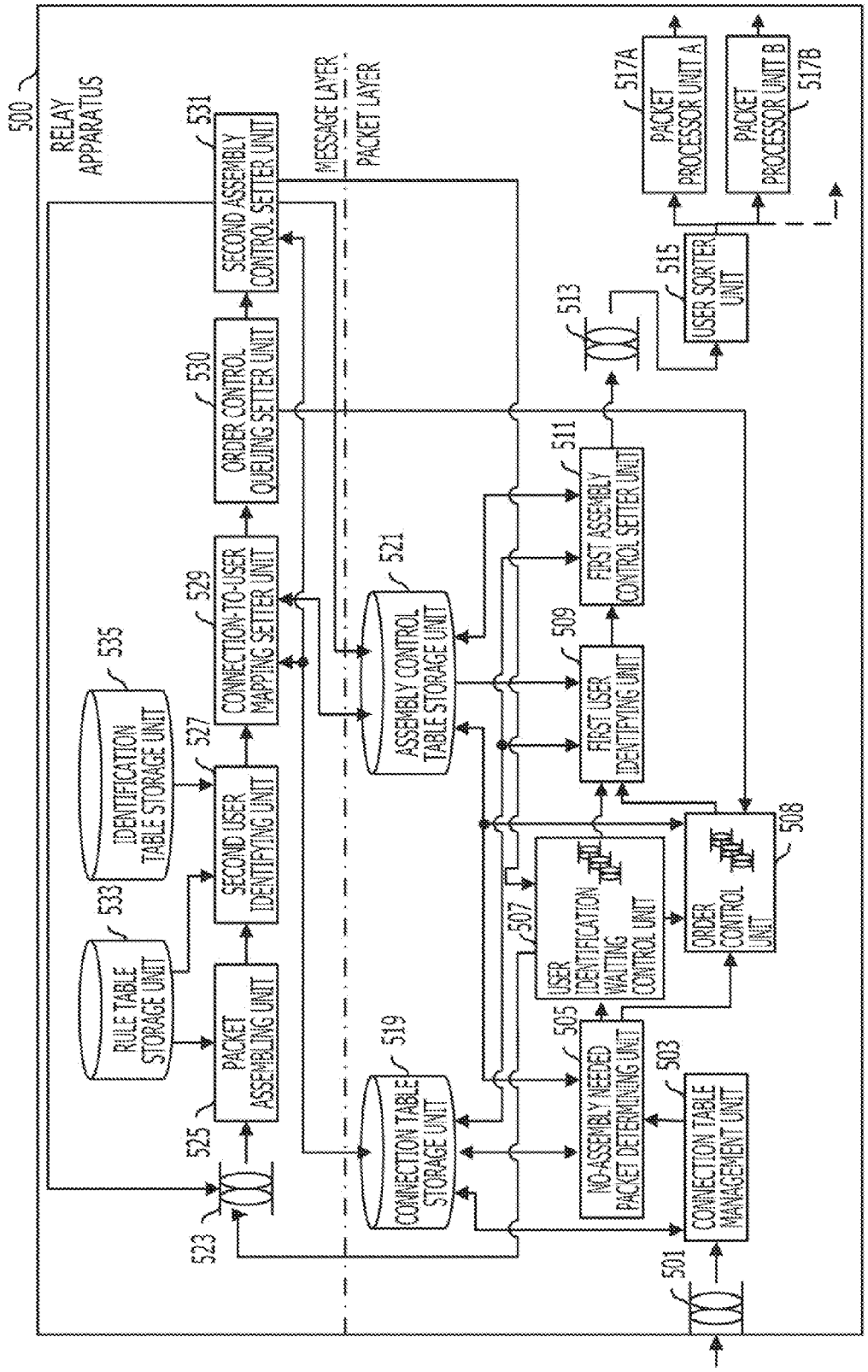
FIG. 21 is a functional block diagram illustrating a relay apparatus of a fourth embodiment.

To not reverse the order, a relay apparatus 500 of FIG. 21 is employed. The relay apparatus 500 includes, as elements of a packet layer, queue 501, connection table management unit 503, no-assembly needed packet determining unit 505, user identification waiting control unit 507, order control unit 508, first user identifying unit 509, first assembly control setter unit 511, queue 513, user sorter unit 515, packet processor unit A (517A), packet processor unit B (517B), connection table storage unit 519, and assembly control table storage unit 521. The packet processor unit 517 performs the process thereof for each user, and the number of packet processor units 517 is not limited to two.

The relay apparatus 500 further includes, as elements of a message layer, queue 523, packet assembling unit 525, second user identifying unit 527, connection-to-user mapping setter unit 529, order control queuing setter unit 530, second assembly control setter unit 531, rule table storage unit 533, and identification table storage unit 535.

The packets received by the relay apparatus 500 are sequentially stored in the queue 501. The connection table management unit 503 extracts the data of the packets from the queue 501 sequentially, updates the connection table storage unit 519 as necessary, and outputs the data of the packet extracted from the queue 501 to the no-assembly needed packet determining unit 505. The no-assembly needed packet determining unit 505 updates an assembly control table stored on the assembly control table storage unit 521 if necessary by referencing the connection table storage unit 519. The no-assembly needed packet determining unit 505 processes the data of the packet received from the connection table management unit 503, and outputs the processed data to the user identification waiting control unit 507. The user identification waiting control unit 507 receives the data of the packet from the no-assembly needed packet determining unit 505, copies the data of the packet and stores the data of the packet in the queue 523. The user identification waiting control unit 507 also stores the data of the packet in the queue thereof on a per connection basis.

If the entry in the assembly control table is set to be "false," i.e., no-assembly needed, the no-assembly needed packet determining unit 505 outputs the packet data with the control data to the order control unit 508.

In accordance with data stored on the rule table storage unit 533, the packet assembling unit 525 extracts the data of the packet stored in the queue 523, and performs the packet assembly process on the extracted data. The packet assembling unit 525 thus outputs the process results to the second user identifying unit 527. In accordance with the data stored on the rule table storage unit 533 and the identification table storage unit 535, the second user identifying unit 527 performs the process thereof on the output data output from the packet assembling unit 525 and outputs the process results thereof to the connection-to-user mapping setter unit 529. In response to the output data from the second user identifying unit 527, the connection-to-user mapping setter unit 529 references the connection table storage unit 519, updates the assembly control table storage unit 521, and outputs the output data from the second user identifying unit 527 to the order control queuing setter unit 530. Upon receiving the data from the connection-to-user mapping setter unit 529, the order control queuing setter unit 530 outputs to the order control unit 508 a queue blocking instruction of the connection.

The order control unit 508 starts storing the data of the packet in the queue thereof in response to the queue blocking instruction from the order control queuing setter unit 530.

The order control queuing setter unit 530 outputs the received data as is to the second assembly control setter unit 531. In response to the output data from the order control queuing setter unit 530, the second assembly control setter unit 531 references the connection table storage unit 519, updates the assembly control table storage unit 521 and outputs a queue unblocking instruction to the user identification waiting control unit 507.

The user identification waiting control unit 507 outputs the data of the packet in the queue to the first user identifying unit 509 in response to the instruction from the second assembly control setter unit 531. The user identification waiting control unit 507 further outputs all the data of the packet from the queue thereof, and outputs a queue output instruction to the order control unit 508. Upon receiving the queue output instruction from the user identification waiting control unit 507, the order control unit 508 unblocks the queue thereof, and sequentially outputs the data of the packet stored in the queue thereof to the first user identifying unit 509.

In response to the data of the received packet, the first user identifying unit 509 references the connection table storage unit 519 and the assembly control table storage unit 521, and sets the user identifier in the data of the packet. The first user identifying unit 509 outputs the data of the packet to the first assembly control setter unit 511. The first assembly control setter unit 511 references the data of the packet, and if necessary, updates the connection table storage unit 519 and the assembly control table storage unit 521. The first assembly control setter unit 511 stores the data of the packet in the queue 513.

The user sorter unit 515 sequentially extracts the data of the packets stored in the queue 513, and outputs the data of the packets to the packet processor unit 517 responsive to the user identification information. The packet processor unit 517 performs a specific process on the data of the packet.

If the data of the unnecessary packet is stored in the queue 523, the second assembly control setter unit 531 gives an instruction to delete the unnecessary packet.

The operation of the relay apparatus 500 of FIG. 21 is described in detail with reference to FIGS. 22-28.

Figure 22:
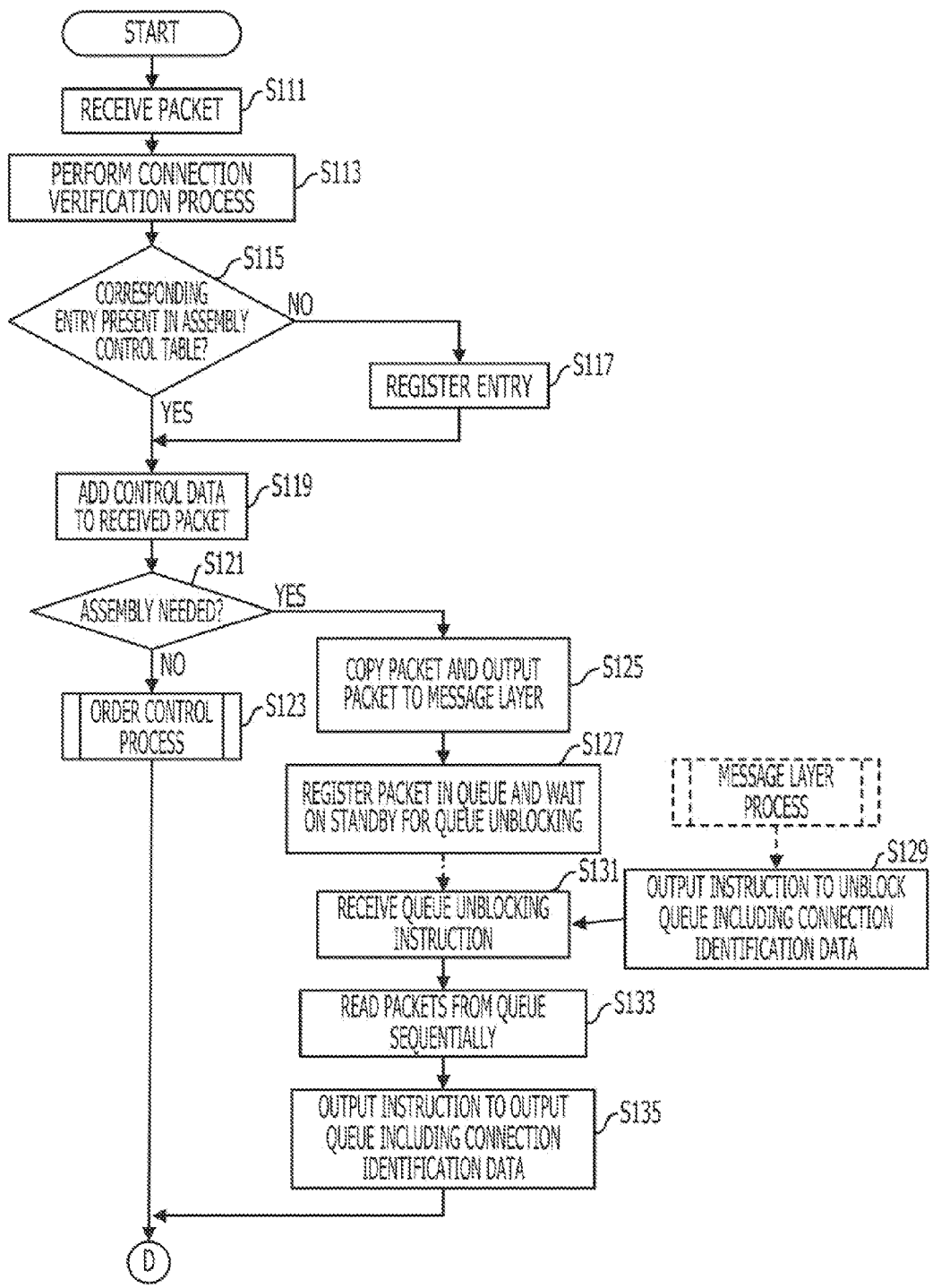
FIG. 22 is a flowchart illustrating a process of the fourth embodiment.

A packet receiver (not illustrated) in the relay apparatus 500 receives a packet from a device connected to the relay apparatus 500 and then stores the packet in the queue 501 (111 in FIG. 22). The connection table management unit 503 reads the data of the packet from the queue 501 and performs a connection verification process on the packet (S113). More specifically, the connection table management unit 503 extracts, from a transmission control protocol (TCP) or a user datagram protocol (UDP)/internet protocol (IP) header, connection identification data, e.g., a transmission source IP address, a destination IP address, a transmission source port number, and a destination port number. The connection table management unit 503 then identifies a connection from the connection identification data. The connection table management unit 503 then searches a connection table of the connection table storage unit 519 according to the connection identification data. If no corresponding entry is found, the connection table management unit 503 registers a new entry including the connection identification data. If a corresponding entry is found, the connection table management unit 503 updates the corresponding entry in response to a packet as a process target. The connection table management unit 503 then outputs the data of the packet as a process target to the no-assembly needed packet determining unit 505. The connection table may be like the table of FIG. 5 in the second embodiment.

Upon receiving the data of the packet as a process target, the no-assembly needed packet determining unit 505 extracts the connection identification data from the header of the packet, searches the connection table in the connection table storage unit 519 according to the connection identification data, and determines whether the entry is present in the assembly control table depending on the presence or absence of a link to the entry in the assembly control table in the assembly control table storage unit 521 (S115). If no corresponding entry is present in the assembly control table, the no-assembly needed packet determining unit 505 registers in the assembly control table the entry corresponding to the connection identification data (S117), and then registers the link to the entry in the connection table of the connection table storage unit 519 with the link mapped to the connection identification data. Processing proceeds to S119. The assembly control table may be like the table illustrated in FIG. 6 in the second embodiment. In S117, the assembly flag is set to "true," and the user identifier is set to empty "-" in the entry.

Subsequent to S117, or if the corresponding entry is present in the assembly control table, the no-assembly needed packet determining unit 505 attaches control data to the data of the packet as the process target (S119). The packet data with the control data may be like the data of FIG. 7 in the second embodiment. Nothing is set for the user identifier at default.

According to the embodiment, the no-assembly needed packet determining unit 505 determines whether the assembly flag of the entry in the assembly control table is "true," e.g., assembly needed (S121). If the routine has proceeded via S117, it is not necessary to check the assembly control table. In the other case, the no-assembly needed packet determining unit 505 performs the determination operation in S121. If assembly is needed, e.g., if the assembly flag of the entry is "true," the no-assembly needed packet determining unit 505 outputs the packet data with the control data to the user identification waiting control unit 507. The user identification waiting control unit 507 copies and stores the packet data with the control data in the queue 523 in the message layer (S125). The user identification waiting control unit 507 then registers the packet data with the control data in the queue thereof on a per connection basis, and then waits on standby until the queue unblocking (S127). A queue unblocking instruction is output by the second assembly control setter unit 531 after the message layer process to be discussed below is performed.

If the assembly flag is "false," e.g., if no assembly is needed, the no-assembly needed packet determining unit 505 outputs the packet data with the control data to the order control unit 508. The order control unit 508 performs an order control process (S123). The order control process is described below.

If the packet data with the control data is registered in the queue 523, the message layer process of the embodiment is performed. The message layer process is described with reference to FIGS. 23-25.

Figure 23:
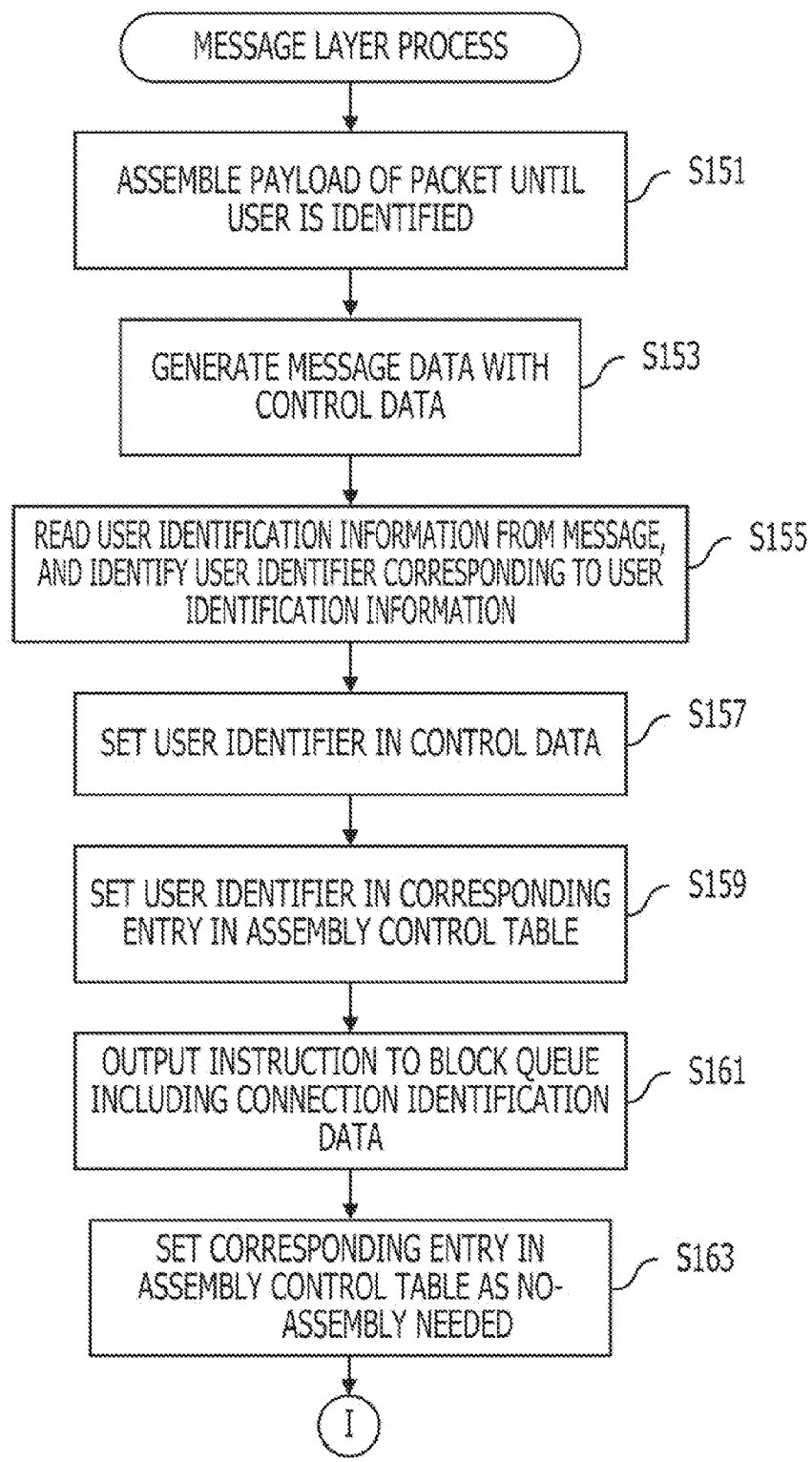
FIG. 23 is a flowchart illustrating a message layer process of the fourth embodiment.

The packet assembling unit 525 extracts, from the queue 523, the packet data with the control data which is from the head packet of the message up to the packet including the user identification information, removes the packet header from the packet data with the control data, assembles the payload of the packets, and stores the packets in the memory thereof (S151 in FIG. 23). In this operation, the packet assembling unit 525 uses an assembly setting table stored on the rule table storage unit 533. The assembly setting table may be like the table of FIG. 9 in the second embodiment.

The packet assembling unit 525 identifies the corresponding entry in the assembly setting table based on the connection identification data identified by the header of the packet. In response to the assembly setting of the corresponding entry, the packet assembling unit 525 reads from the queue 523 the packet data with the control data of the packet that becomes necessary.

Using part of the assembled message, the packet assembling unit 525 generates the message data with the control data and stores the message data with the control data on the memory thereof (S153). The message data with the control data may have the data format illustrated in FIG. 10 in the second embodiment. Upon generating the message data with the control data, the packet assembling unit 525 outputs the message data with the control data to the second user identifying unit 527.

In response to an identification rule table stored on the rule table storage unit 533, the second user identifying unit 527 extracts the user identification information from the partial message data included in the message data with the control data received from the packet assembling unit 525, and searches an identification table stored on the identification table storage unit 535 to identify the corresponding user identifier (S155). The identification rule table may be like the table of FIG. 11 in the second embodiment. The identification table may be like the table of FIG. 12 in the second embodiment.

The second user identifying unit 527 sets in the control data the user identifier identified in S155, and outputs the message data with the control data to the connection-to-user mapping setter unit 529 (S157).

The connection-to-user mapping setter unit 529 extracts the connection identification data (the transmission source IP address, the destination IP address, the transmission source port number, and the destination port number) from the packet header included in the message data with the control data, identifies the corresponding entry in the assembly control table by searching the connection table, and sets the user identifier included in the control data into the entry (S159). The connection-to-user mapping setter unit 529 outputs the message data with the control data to the order control queuing setter unit 530.

Figure 24:
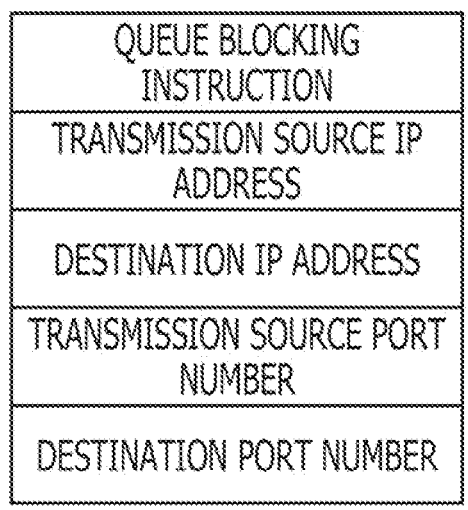
FIG. 24 illustrates an example of the data format of a queue block instruction.

Upon receiving the message data with the control data with the user identifier set therewithin, the order control queuing setter unit 530 extracts the connection identification data from the packet header included in the received data, and outputs to the order control unit 508 a queue blocking instruction including the connection identification data (S161). The queue blocking instruction has a data format of FIG. 24. As illustrated in FIG. 24, the data format includes a queue blocking instruction, a transmission source IP address, a destination IP address, a transmission source port number, and a destination port number.

Upon receiving the queue blocking instruction including the connection identification data, the order control unit 508 blocks the queue of the connection identified by the connection identification data. The queue, when blocked, stores the packet data with the control data. At this point, no-assembly needed status is not set in the assembly control table. The packet data with the control data is not yet output to the order control unit 508 in practice. The order control queuing setter unit 530 outputs the received packet data with the control data to the second assembly control setter unit 531.

Upon receiving the message data with the control data, the second assembly control setter unit 531 extracts the connection identification data from the packet header included in the message data with the control data, and searches the connection table to identify the mapped entry within the assembly control table, and thus sets the assembly flag of the entry as no-assembly needed (S163). Processing proceeds to a process of FIG. 25 via a point I.

The no-assembly needed packet determining unit 505 outputs the data of the packets of the same connection to the order control unit 508, and the order control unit 508 starts queuing.

Figure 25:
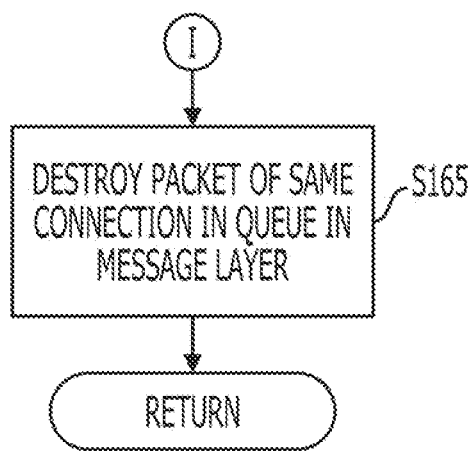
FIG. 25 is a flowchart illustrating the message layer process of the fourth embodiment.

With reference to FIG. 25, the second assembly control setter unit 531 destroys in the queue 523 a packet in the message layer from which the same connection identification data as the connection identification data identified in S163 is extracted (S165). In this way, data of a packet stored in the queue 523 in a redundant fashion is deleted. Although the process of the second assembly control setter unit 531 still continues, the main routine is discussed for convenience of explanation.

Returning to the discussion of the main routine of FIG. 22, the second assembly control setter unit 531 outputs to the user identification waiting control unit 507 a queue unblocking instruction including the connection identification data identified in S163 (S129). The second assembly control setter unit 531 outputs the data illustrated in FIG. 13, for example.

Upon receiving the queue unblocking instruction including the connection identification data (S131), the user identification waiting control unit 507 sequentially reads the data of the packets in the queue of the connection identified by the connection identification data and outputs the packet data to the first user identifying unit 509 (S133).

Figure 26:
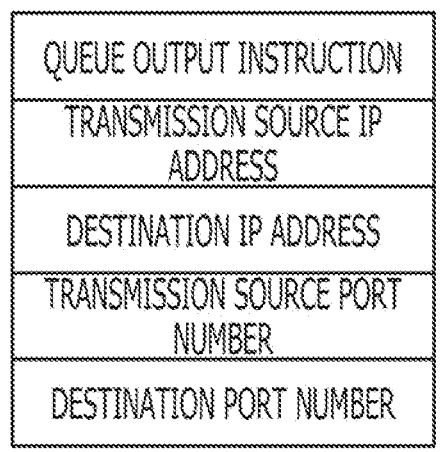
FIG. 26 illustrates an example of a data format of a queue output instruction.

Upon reading all the packet data with the control data from the queue of the connection identified by the connection identification data, the user identification waiting control unit 507 outputs to the order control unit 508 a queue output instruction including the connection identification data (S135). The queue output instruction is data which may be in a format as illustrated in FIG. 26. As illustrated in FIG. 26, the format includes a queue blocking instruction, a transmission source IP address, a destination IP address, a transmission source port number, and a destination port number. Processing proceeds to a process of FIG. 28 via a point D.

Figure 27:
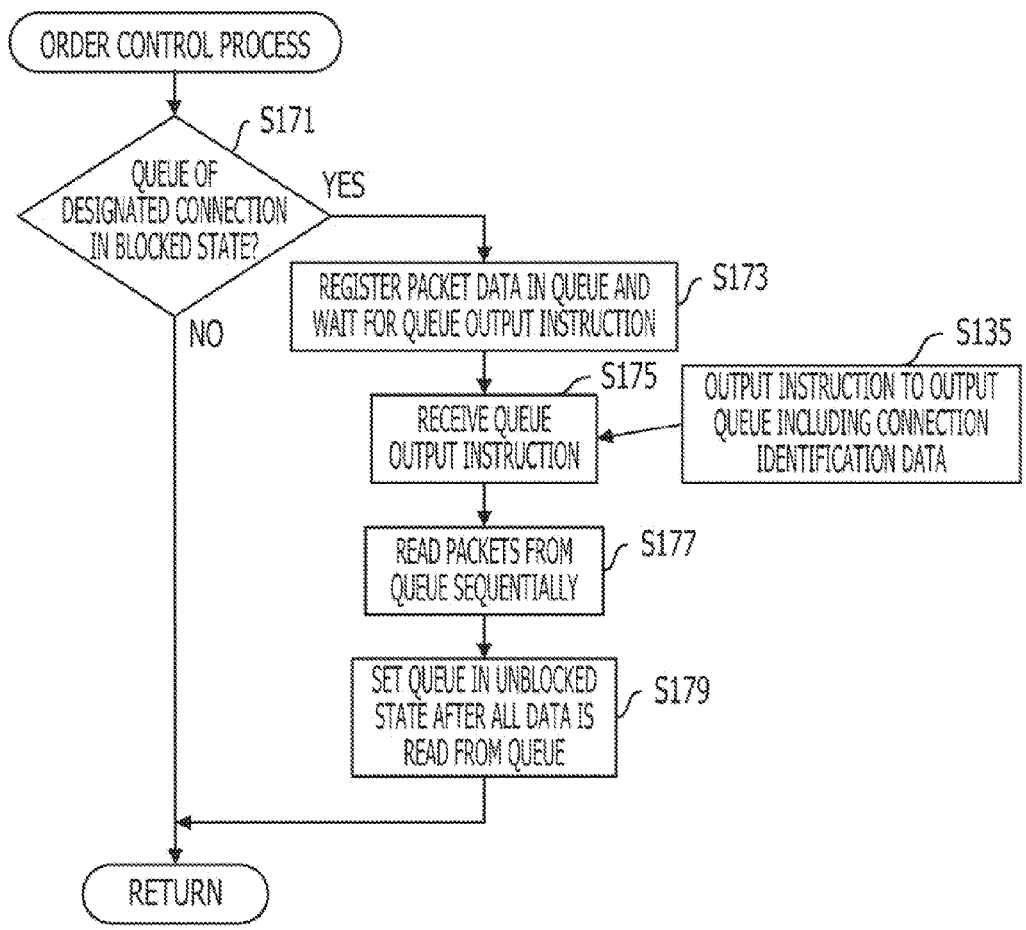
FIG. 27 is a flowchart illustrating an order control process.

The order control process is described with reference to FIG. 27. Upon receiving the packet data with the control data in the no-assembly needed status, the order control unit 508 determines whether the queue of the connection identified by the connection identification data extracted from the packet data is in a blocked state (S171). As described above, the queue shifts to a blocked state in response to the queue blocking instruction from the order control queuing setter unit 530.

If the queue is not in a blocked state, e.g., it is in an unblocked state, the order control unit 508 introduces the received packet data with the control data into the queue, and then outputs the packet data to the first user identifying unit 509 in the order of the queue. Processing returns to the main routine.

If the queue is in a blocked state, the order control unit 508 registers the received packet data with the control data in the queue of the connection and waits on standby for a queue output instruction (S173). As described above, the user identification waiting control unit 507 outputs the queue output instruction including the connection identification data. The order control unit 508 receives the queue output instruction including the connection identification data (S175). The order control unit 508 sequentially reads the packet data with the control data from the queue of the connection identified by the connection identification data, and then outputs the packet data with the control data to the first user identifying unit 509 (S177). Upon reading all the packet data with the control data from the queue of the connection, the order control unit 508 shifts the queue to the unblocked state (S179). Processing thus returns to the main routine.

Through the above-described process, the packet data with the control data is output from the queue within the order control unit 508 after the packet data with the control data is output from the queue within the user identification waiting control unit 507. If the order control unit 508 reads the packet data with the control data from the queue thereof, the order control unit 508 outputs the packet data with the control data as is to the first user identifying unit 509 in the reception order. The packet data with the control data is thus stored in the queue 513 in the reception order.

Figure 28:
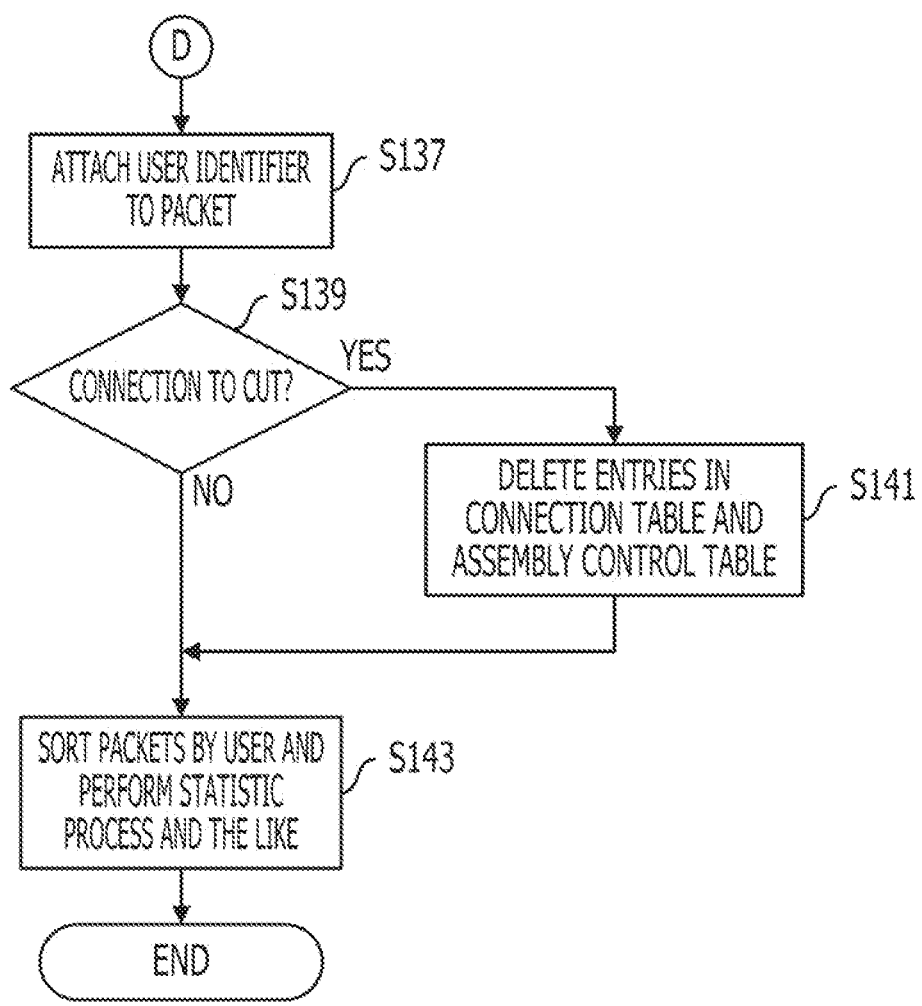
FIG. 28 is a flowchart illustrating a process of the fourth embodiment.

Processing proceeds to the process of FIG. 28 via the point D in FIG. 22. In response to the packet data with the control data, the first user identifying unit 509 extracts the connection identification data from the packet data, searches the connection table, and identifies the mapped entry in the assembly control table. The first user identifying unit 509 reads the user identifier in the entry, and attaches the user identifier to the control data of the packet data with the control data. The first user identifying unit 509 thus outputs the packet data with the control data with the user identifier attached thereto to the first assembly control setter unit 511 (S137).

Upon receiving the packet data with the control data, the first assembly control setter unit 511 determines based on the header of the packet data whether the packet is a packet for connection breaking such as a FIN packet in TCP in response to the reception of the packet data with the control data (S139). If the packet is a packet for connection breaking, the first assembly control setter unit 511 extracts the connection identification data from the packet data, searches the connection table according to the connection identification data to identify the corresponding entry, identifies an entry in the assembly control table mapped to the corresponding entry, and then deletes these entries (S141). Processing proceeds to S143.

Subsequent to S141 or if the packet is not a packet for connection breaking, the first assembly control setter unit 511 outputs the received packet data with the control data to the queue 513.

The user sorter unit 515 reads the packet data with the control data from the queue 513, identifies the packet processor unit 517 responsive to the packet of the user identifier in accordance with the user identifier of the control data, and then outputs the packet data with the control data to the packet processor unit 517. Upon receiving the packet data with the control data, the packet processor unit 517 performs the filtering process, the statistic process, the log recording process, and the like (S143). As described above, the process of the packet processor unit 517 remains unchanged from the related art process, and is not discussed any further. Subsequent to the process of the packet processor unit 417, the data of the packet with the control data thereof removed is output to the port connected to the destination of the packet if the filtering process is not performed.

Through the above-described process, the user identifier is identified by simply assembling part of the packets related to the first message from the connection making to the connection breaking. The workload in the message layer is substantially reduced. The order of introduction of the packets into the queue 513 may be identical to the order of packet reception.

The embodiment described above is based on the premise that one connection is made for one user. In practice, a plurality of users may be present for one connection. If a plurality of users are present for one connection, the user identifier is identified on a per message basis. However, the arrangement of a plurality of users for one connection remains unchanged from the above-described embodiment in that not the whole message is assembled. Packets are assembled until the user identification information and message length are extracted. If the message length is extracted from the header of the message, a message border is identified. At a message border, packets for the next message are assembled. If the user identifier is identified on a per message basis, part of the packets of the message is not assembled. The workload is thus reduced.

Fifth Embodiment

Figure 29:
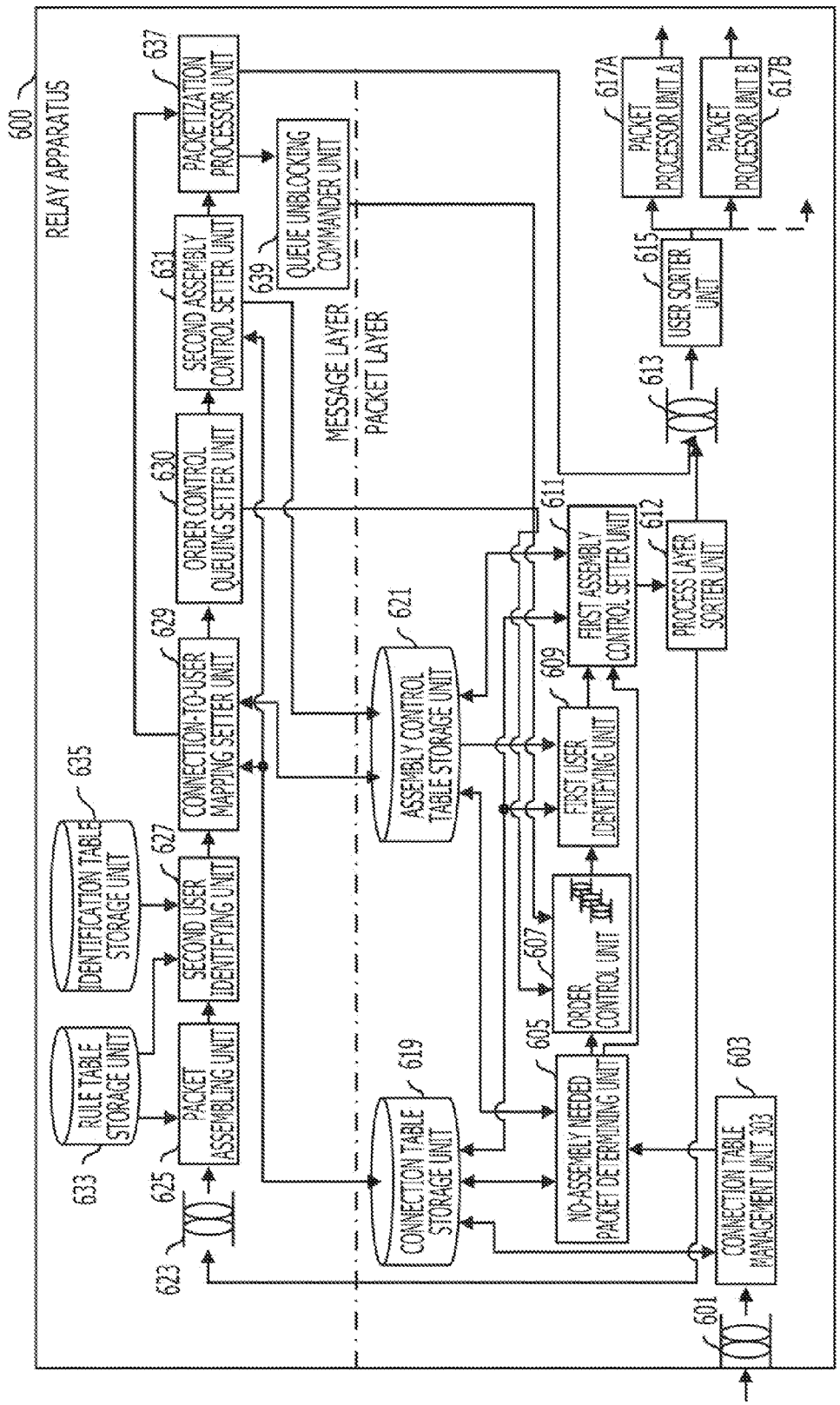
FIG. 29 is a functional block diagram illustrating a relay apparatus of a fifth embodiment.

The relay apparatus 400 of the third embodiment also returns the data of a packet, output to the message layer, to the packet layer. The data of the packets may be stored in the queue 413 in an order different from the order of packet reception. To not reverse the order, a relay apparatus 600 of FIG. 29 is employed.

The relay apparatus 600 includes, as elements of a packet layer, queue 601, connection table management unit 603, no-assembly needed packet determining unit 605, order control unit 607, first user identifying unit 609, first assembly control setter unit 611, process layer sorter unit 612, queue 613, user sorter unit 615, packet processor unit A (617A), packet processor unit B (617B), connection table storage unit 619, and assembly control table storage unit 621. The packet processor unit 617 performs the process thereof for each user, and the number of packet processor units 617 is not limited to two.

The relay apparatus 600 further includes, as elements of a message layer, queue 623, packet assembling unit 625, second user identifying unit 627, connection-to-user mapping setter unit 629, order control queuing setter unit 630, second assembly control setter unit 631, rule table storage unit 633, identification table storage unit 635, packetization processor unit 637, and queue unblocking commander unit 639.

The packets received by the relay apparatus 600 are sequentially stored in the queue 601. The connection table management unit 603 extracts the data of the packets from the queue 601 sequentially, updates the connection table storage unit 619 as necessary, and outputs the data of the packet extracted from the queue 601 to the no-assembly needed packet determining unit 605. The no-assembly needed packet determining unit 605 updates an assembly control table stored on the assembly control table storage unit 621 if necessary by referencing the connection table storage unit 619. The no-assembly needed packet determining unit 605 processes the data of the packet received from the connection table management unit 603. If packet assembly is needed, the no-assembly needed packet determining unit 605 outputs the data of the packet to the first assembly control setter unit 611. If no packet assembly is needed, the no-assembly needed packet determining unit 605 outputs the data of the packet to the order control unit 607. The order control unit 607 has a queue for each connection. The order control unit 607 performs a process in response to an instruction from the order control queuing setter unit 630 and the queue unblocking commander unit 639 as described below. Upon receiving a queue unblocking instruction, the order control unit 607 outputs the data of the packet to the first user identifying unit 609.

The first user identifying unit 609 references the connection table storage unit 619 and the assembly control table storage unit 621. If the user identifier is already identified, the first user identifying unit 609 attaches the user identifier to the data of the packet, and then outputs the data of the packet to the first assembly control setter unit 611.

The first assembly control setter unit 611 references the data of the packet, and updates the connection table storage unit 619 and the assembly control table storage unit 621 if necessary. The first assembly control setter unit 611 then outputs the data of the packet to the process layer sorter unit 612. In response to the assembly flag included in the data of the packet, the process layer sorter unit 612 stores the data of the packet in the queue 623 in the message layer if packet assembly is needed. The process layer sorter unit 612 stores the data of the packet in the queue 613 if no packet assembly is needed.

In accordance with data stored on the rule table storage unit 633, the packet assembling unit 625 extracts the data of the packet stored in the queue 623, and performs the packet assembly process on the extracted data. The packet assembling unit 625 thus outputs the process results to the second user identifying unit 627. In accordance with data stored on the rule table storage unit 633 and the identification table storage unit 635, the second user identifying unit 627 performs the process thereof on the output data output from the packet assembling unit 625 and outputs the process results thereof to the connection-to-user mapping setter unit 629. In response to the output data from the second user identifying unit 627, the connection-to-user mapping setter unit 629 references the connection table storage unit 619, updates the assembly control table storage unit 621, and outputs the output data from the second user identifying unit 627 to the order control queuing setter unit 630. Upon receiving the data from the connection-to-user mapping setter unit 629, the order control queuing setter unit 630 outputs to the order control unit 607 a queue blocking instruction. The order control queuing setter unit 630 outputs the received data to the second assembly control setter unit 631. In response to the output data from the connection-to-user mapping setter unit 629, the second assembly control setter unit 631 references the connection table storage unit 619, updates the assembly control table storage unit 621, and outputs the received data to the packetization processor unit 637. The packetization processor unit 637 partitions the message data with the control data into the packet data with the control data and outputs the packet data with the control data to the queue 613. Upon completing the process, the packetization processor unit 637 outputs an instruction to the queue unblocking commander unit 639. In response to the instruction from the packetization processor unit 637, the queue unblocking commander unit 639 outputs a queue unblocking instruction to the order control unit 607.

The packet assembling unit 625 and the connection-to-user mapping setter unit 629 process the data of a packet needing no assembly and stored in the queue 623, and the connection-to-user mapping setter unit 629 outputs the process results to the packetization processor unit 637.

The second user identifying unit 627 outputs to the packetization processor unit 637 the data of the packet needing no assembly but stored in the queue 623.

The user sorter unit 615 sequentially extracts the data of the packets from the queue 613, and outputs the data of the packets to the packet processor unit 617 responsive to the user identifier. The packet processor unit 617 performs a specific process thereof on the data of the packet.

The operation of the relay apparatus 600 is described in detail with reference to FIGS. 30-34.

Figure 30:
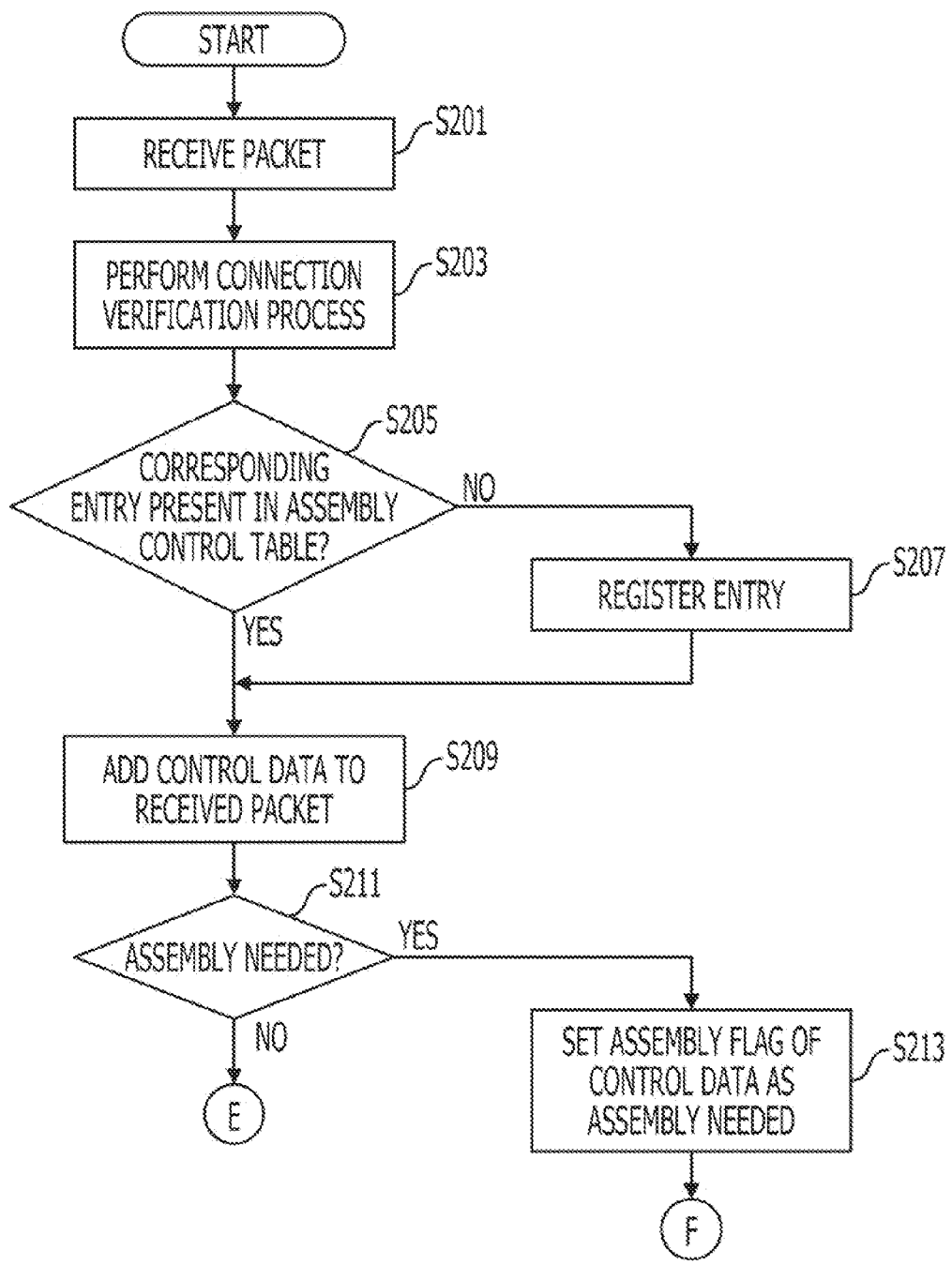
FIG. 30 is a flowchart illustrating a process of the fifth embodiment.

A packet receiver (not illustrated) in the relay apparatus 600 receives a packet from a device connected to the relay apparatus 600 and then stores the packet in the queue 601 (S201 in FIG. 30). The connection table management unit 603 reads the data of the packet from the queue 601 and performs a connection verification process on the packet (S203). More specifically, the connection table management unit 603 extracts, from a transmission control protocol (TCP) or a user datagram protocol (UDP)/internet protocol (IP) header, connection identification data, e.g., a transmission source IP address, a destination IP address, a transmission source port number, and a destination port number. The connection table management unit 603 then identifies a connection from the connection identification data. The connection table management unit 603 then searches a connection table of the connection table storage unit 619 according to the connection identification data. If no corresponding entry is found, the connection table management unit 603 registers a new entry including the connection identification data. If a corresponding entry is found, the connection table management unit 603 updates the corresponding entry in response to a packet as a process target. The connection table management unit 603 then outputs the data of the packet as a process target to the no-assembly needed packet determining unit 605. The connection table may be like the table of FIG. 5 in the second embodiment.

Upon receiving the data of the packet as a process target, the no-assembly needed packet determining unit 605 extracts the connection identification data from the header of the packet, searches the connection table in the connection table storage unit 619 according to the connection identification data, and determines whether the entry is present in the assembly control table depending on the presence or absence of a link to the entry in the assembly control table in the assembly control table storage unit 621 (S205). If no corresponding entry is present in the assembly control table, the no-assembly needed packet determining unit 605 registers in the assembly control table the entry corresponding to the connection identification data (S207), and then registers the link to the entry in the connection table of the connection table storage unit 619 with the link mapped to the connection identification data. Processing proceeds to S209. The assembly control table may be like the table illustrated in FIG. 6 in the second embodiment. The assembly flag is set to "true" at default. Nothing is set for the user identifier at default.

Subsequent to S207, or if the corresponding entry is present in the assembly control table, the no-assembly needed packet determining unit 605 attaches control data to the data of the packet as the process target (S209).

FIG. 17 illustrates the packet data with the control data of the embodiment. Nothing is set for the assembly flag and the user identifier at default.

The no-assembly needed packet determining unit 605 determines whether the assembly flag of the entry in the assembly control table mapped to the connection identification data extracted from the header of the packet as the process target is "true" (assembly needed) (S211). If the assembly flag of the entry of the assembly control table is "true," the no-assembly needed packet determining unit 605 sets the assembly flag of the control data to be assembly needed, and outputs the packet data with the control data to the first assembly control setter unit 611 (S213). The no-assembly needed packet determining unit 605 may output the packet data with the control data to the first user identifying unit 609 instead of to the first assembly control setter unit 611. In that case as well, the first user identifying unit 609 outputs the packet data with the control data to the first assembly control setter unit 611 without performing any particular process on the packet data with the control data. Processing proceeds to a process of FIG. 31 via a point F.

If the assembly flag of the entry in the assembly control table is "false," the no-assembly needed packet determining unit 605 outputs the packet data with the control data to the order control unit 607. The assembly flag in the control data may be set to be no-assembly needed. The assembly flag "false" means that the user identifier has been identified but the process in the message layer is not necessarily completed. The packet data with the control data is output to the order control unit 607 to maintain the queue. The assembly flag in the control data may be set to be no-assembly needed. Processing proceeds to a process of FIG. 31 via a point E.

Figure 31:
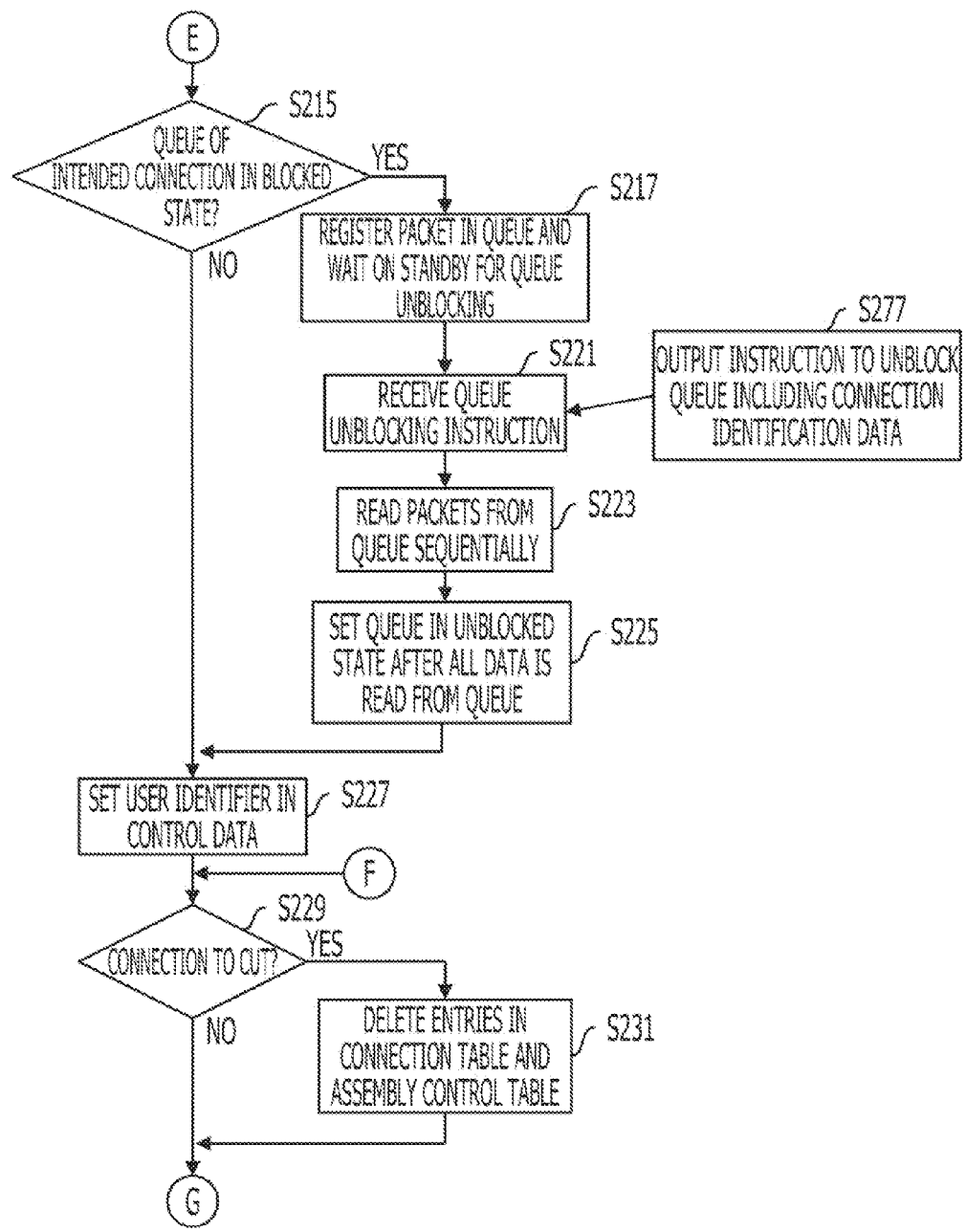
FIG. 31 is a continuation of the flowchart of FIG. 30.

The process of FIG. 31 is described below. Since the identification operation of the user identifier has not been discussed, a process subsequent to S213, i.e., a process subsequent to a point F is described first. S215-S227 are described later.

Upon receiving the packet data with the control data, the first assembly control setter unit 611 determines based on the header of the packet data whether the packet is a packet for connection breaking such as a FIN packet in TCP in response to the reception of the packet data with the control data (S229). If the packet is a packet for connection breaking, the first assembly control setter unit 611 extracts the connection identification data from the packet data, searches the connection table according to the connection identification data to identify the corresponding entry, identifies an entry in the assembly control table mapped the corresponding entry, and then deletes these entries (S231). The first assembly control setter unit 611 processes the packet data with the control data and outputs the processed results to the process layer sorter unit 612. Processing proceeds to a process of FIG. 32 via a point G. Even if the packet as the process target is not a packet for connection breaking, the first assembly control setter unit 611 outputs the packet data with the control data to the process layer sorter unit 612. Processing proceeds to the process of FIG. 32 via the point G.

Figure 32:
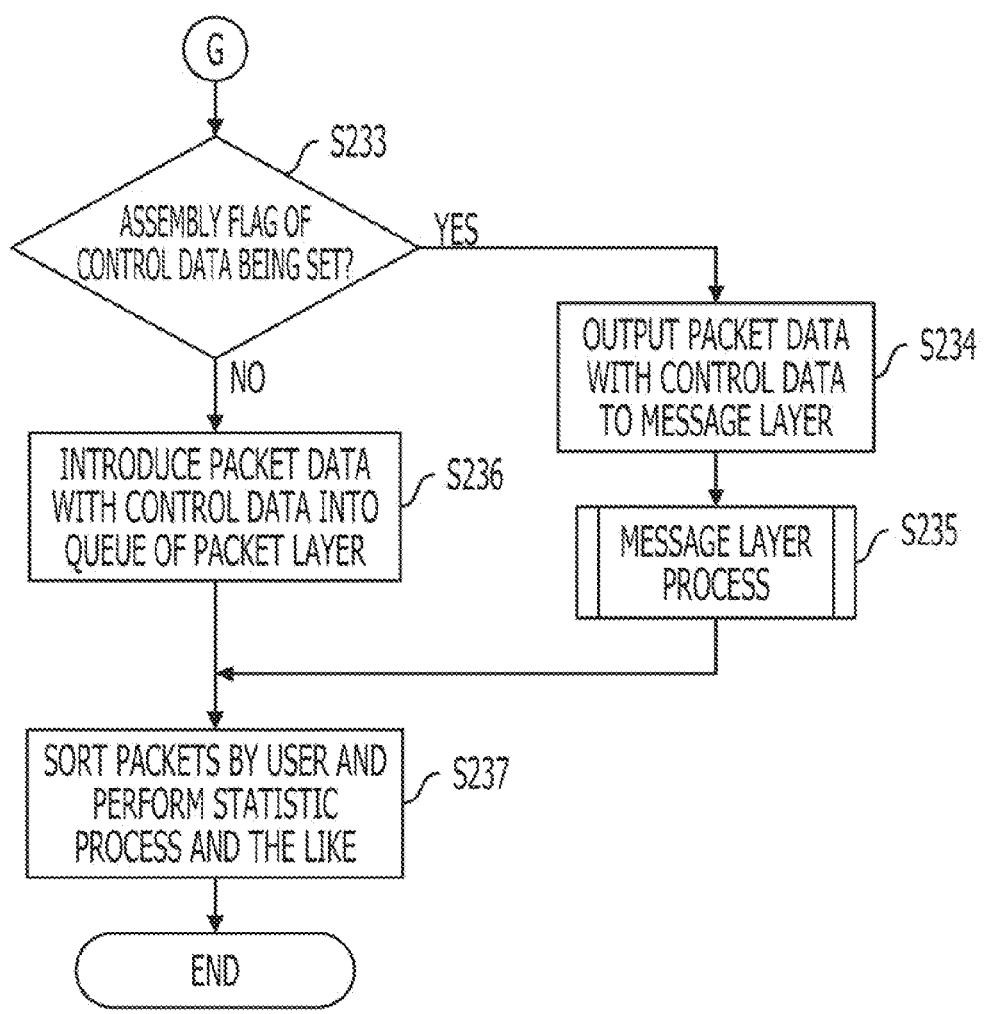
FIG. 32 is a continuation of the flowchart of FIG. 31.

Referring to FIG. 32, the process layer sorter unit 612 determines whether the assembly flag included in the control data of the received packet data with the control data is set as assembly needed (S233). If the assembly flag included in the control data of the received packet data with the control data is set as assembly needed, the process layer sorter unit 612 stores the packet data with the control data in the queue 623 in the message layer (S234). The message layer process is then performed (S235). If the assembly flag included in the control data is no-assembly needed or empty, the process layer sorter unit 612 stores the packet data with the control data in the queue 613 in the packet layer (S236). Since the user identifier is already set in the control data, no assembly is needed.

The message layer process of the embodiment is described below with reference to FIGS. 33 and 34.

Figure 33:
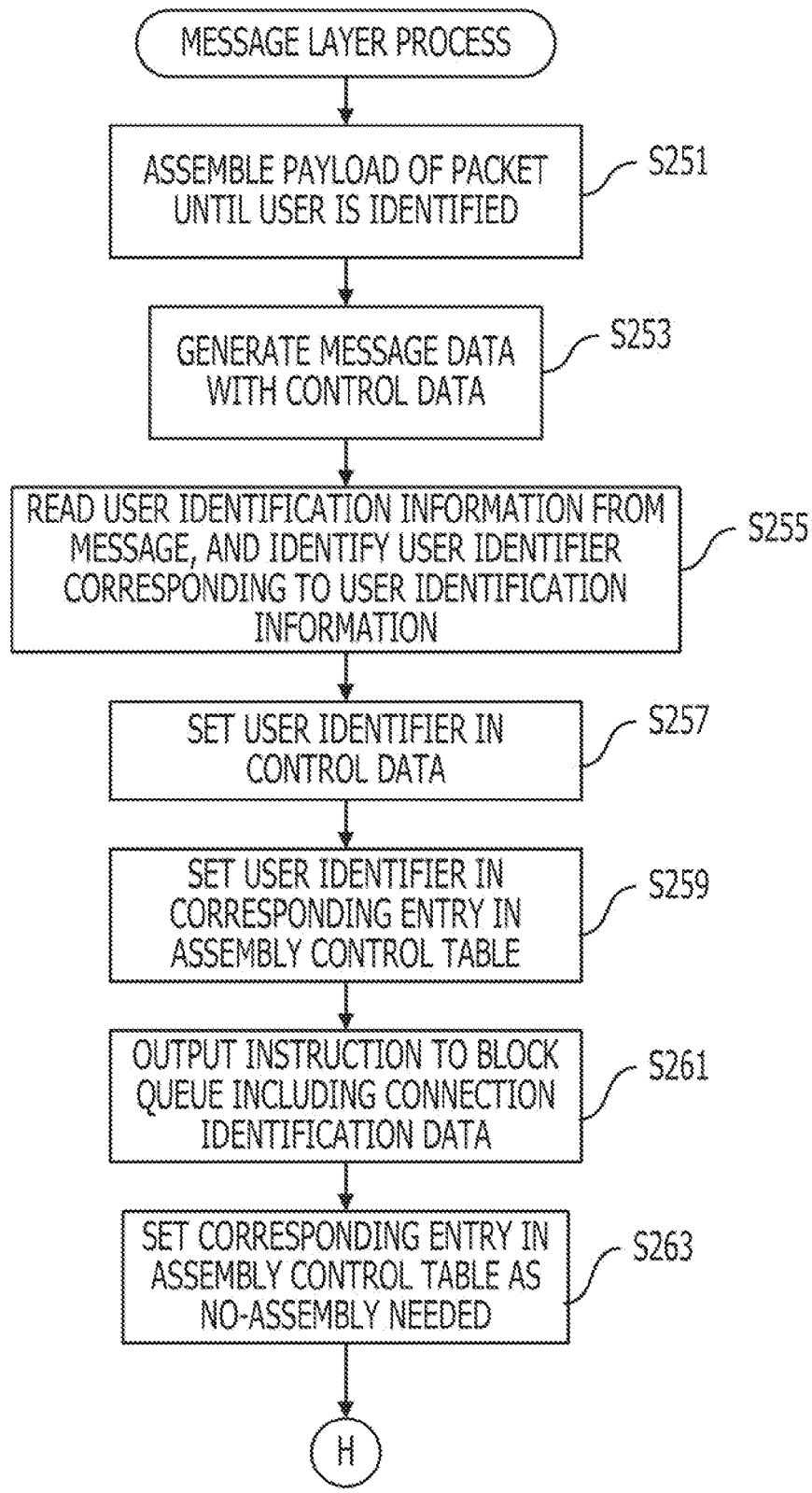
FIG. 33 is a flowchart illustrating a message layer process of the fifth embodiment.

The packet assembling unit 625 extracts from the queue 623 the packet data with the control data of the packets including the head packet of the message to the packet of the message including the user identification information, removes the packet header from the packet data with the control data, assembles the payload of the packets, and stores the packets in the memory thereof (S251 in FIG. 33). In this operation, the packet assembling unit 625 uses an assembly setting table stored on the rule table storage unit 633. The assembly setting table may be like the table of FIG. 9 in the second embodiment.

The packet assembling unit 625 identifies the corresponding entry in the assembly setting table based on the connection identification data identified by the header of the packet. In response to the assembly setting of the corresponding entry, the packet assembling unit 625 reads from the queue 623 the packet data with the control data of the packet that becomes necessary.

Figure 10:
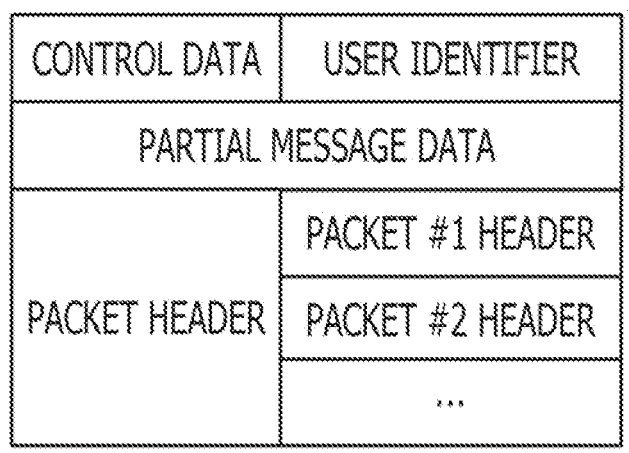
FIG. 10 illustrates a format example of the message data with the control data.

Using part of the assembled message, the packet assembling unit 625 generates the message data with the control data and stores the message data with the control data on the memory thereof (S253). The message data with the control data may have the data format as illustrated in FIG. 10 in the second embodiment. Upon generating the message data with the control data, the packet assembling unit 625 outputs the message data with the control data to the second user identifying unit 627.

In response to an identification rule table stored on the rule table storage unit 633, the second user identifying unit 627 extracts the user identification information from the partial message data included in the message data with the control data received from the packet assembling unit 625, and searches an identification table stored on the identification table storage unit 635 to identify the corresponding user identifier (S255). The identification rule table may be like the table of FIG. 11 in the second embodiment. The identification table may be like the table of FIG. 12 in the second embodiment.

The second user identifying unit 627 sets in the control data the user identifier identified in S255, and outputs the message data with the control data to the connection-to-user mapping setter unit 629 (S257).

The connection-to-user mapping setter unit 629 extracts the connection identification data (the transmission source IP address, the destination IP address, the transmission source port number, and the destination port number) from the packet header included in the message data with the control data, identifies the corresponding entry in the assembly control table by searching the connection table, and sets the user identifier included in the control data into the entry (S259). The connection-to-user mapping setter unit 629 outputs the message data with the control data to the order control queuing setter unit 630.

Upon receiving the message data with the control data with the user identifier set therewithin, the order control queuing setter unit 630 extracts the connection identification data from the packet header included in the received data, and outputs to the order control unit 607 a queue blocking instruction including the connection identification data (S261). The queue blocking instruction may have the data format of FIG. 24.

Upon receiving the queue blocking instruction including the connection identification data, the order control unit 607 blocks the queue of the connection identified by the connection identification data. The queue, when blocked, stores the packet data with the control data. At this point, no-assembly needed status is not set in the assembly control table. The packet data with the control data is not yet output to the order control unit 607 in practice. The order control queuing setter unit 630 outputs the received packet data with the control data to the second assembly control setter unit 631.

Upon receiving the message data with the control data, the second assembly control setter unit 631 extracts the connection identification data from the packet header included in the message data with the control data, and searches the connection table to identify the mapped entry within the assembly control table, and thus sets the assembly flag of the entry as no-assembly needed (S263). Processing proceeds to a process of FIG. 34 via a point H.

The no-assembly needed packet determining unit 605 outputs the data of the packets of the same connection to the order control unit 607, and the order control unit 607 starts queuing.

Figure 34:
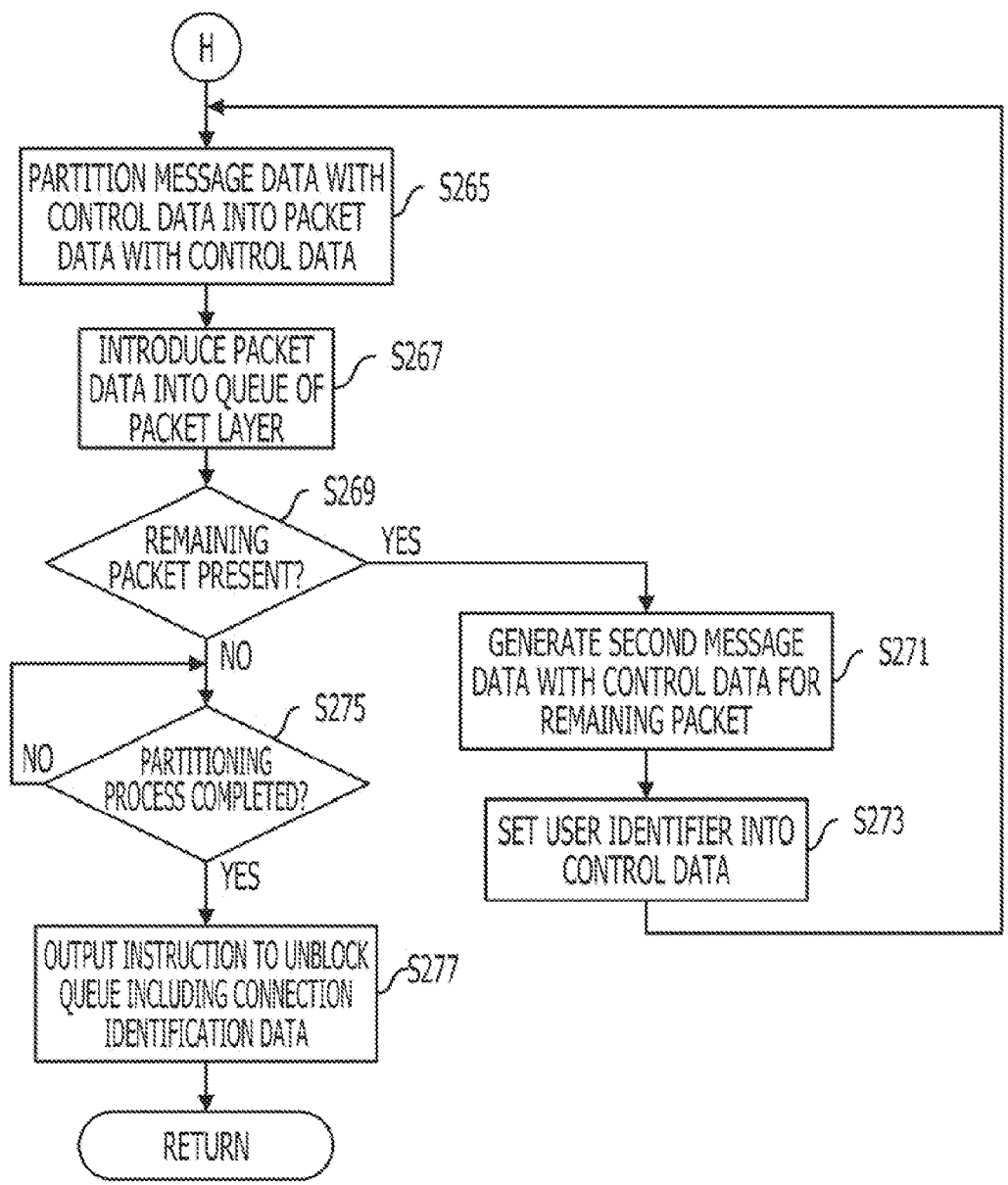
FIG. 34 is a continuation of the flowchart of FIG. 33.

Referring to FIG. 34, the packetization processor unit 637 partitions the received message data with the control data into the packet data with the control data (S265), and introduces the packet data with the control data in the queue 613 (S267). In the packetization process, the packet header is extracted from the message data with the control data, the message is partitioned, and each partitioned message is attached to the packet header. The user identifier included in the control data of the message is set in the control data of the packet. The assembly flag may be set to be empty or no-assembly needed. Even if the data of the packet is output to the message layer without being copied, the packet data with the control data with the user identifier set therewithin is thus stored in the queue 613. The packet process is thus performed.

A packet subsequent to a packet including as a payload the user identification information may be stored in the queue 613 depending on the timing of the packet reception and the throughput of the packet assembly process. In such a case, the following process is to be performed. The packet assembling unit 625 determines whether a remaining packet is present in the queue 623 (S269).

If a remaining packet is present, the packet assembling unit 625 reads from the queue 613 the packet data with the control data of the remaining packet, generates second message data with the control data by performing the packet assembly process, and outputs the second message data with the control data to the second user identifying unit 627 (S271). Although the format of the second message data with control data may be similar to the format of FIG. 10, the second message data with the control data may include a flag different from the flag of the standard message data with the control data. The packet to be assembled does not have the limitation such as the packets up to the packet including the user identification information in the payload.

Upon receiving the second message data with the control data, the second user identifying unit 627 outputs the second message data with the control data as is to the connection-to-user mapping setter unit 629. The connection-to-user mapping setter unit 629 receives the second message data with the control data, extracts the connection identification data from the packet header, and searches the connection table according to the connection identification data to identify the entry of the assembly control table. The connection-to-user mapping setter unit 629 reads the user identifier from the entry, and sets the user identifier in the control data (S273). The connection-to-user mapping setter unit 629 outputs the control data to the packetization processor unit 637. Processing returns to S265.

Even if more than necessary packet data is output to the message layer, the data of the packets is returned to the packet layer. S271 and S273 have been described for exemplary purposes only. In one embodiment, the packet assembling unit 625 may read the user identifier from the assembly control table, set the user identifier in the control data, and then return the control data to the queue 613 in the packet layer. In another embodiment, the packet assembling unit 625 may set the assembly flag of the control data to be no-assembly needed, and then output the control data to the first user identifying unit 609.

If no remaining packet is present in the queue 623, the packetization processor unit 637 determines whether the partitioning process to the packet has been completed (S275). If the partitioning process has not been completed, the packetization processor unit 637 waits until the partitioning process has been completed. If the partitioning process to the packet has been completed, the packetization processor unit 637 outputs to the queue unblocking commander unit 639 an end notification including the connection identification data. Upon receiving the end notification including the connection identification data, the queue unblocking commander unit 639 outputs to the order control unit 607 a queue unblocking instruction including the connection identification data (S277). The queue unblocking instruction has the format of FIG. 13. Processing then returns to the main routine.

Subsequent to the message layer process or S236 in FIG. 32, the user sorter unit 615 reads the packet data with the control data stored in the queue 613, identifies the packet processor unit 617 responsive to the packet of the user identifier based on the user identifier of the control data, and then outputs the packet data with the control data to the packet processor unit 617. Upon receiving the packet data with the control data, the packet processor unit 617 performs the filtering process, the statistic process, the log recording process, and the like (S237). As described above, the process of the packet processor unit 617 remains unchanged from the related art process, and is not discussed any further. Subsequent to the process of the packet processor unit 617, the data of the packet with the control data thereof removed is output to the port connected to the destination of the packet if the filtering process is not performed.

Processing enters via the point E in the process of FIG. 31. Upon receiving the packet data with the control data in the no-assembly needed status, the order control unit 608 verifies whether the queue of the connection identified by the connection identification data extracted from the packet data is in a blocked state (S215). As described above, the queue shifts to a blocked state in response to the queue blocking instruction from the order control queuing setter unit 630.

If the queue is not in a blocked state, e.g., it is in an unblocking state, the order control unit 608 introduces the received packet data with the control data in the queue of the connection. The order control unit 608 sequentially outputs the packets from the queue to the first user identifying unit 609. Processing proceeds to S227.

If the queue is in a blocked state, the order control unit 608 registers the received packet data with the control data in the queue of the connection and waits on standby for a queue output instruction (S217). As described above, the second assembly control setter unit 631 outputs the queue output instruction including the connection identification data (S277). The order control unit 607 receives the unblocking instruction including the connection identification data (S221). The order control unit 607 sequentially reads the packet data with the control data from the queue of the connection identified by the connection identification data, and then outputs the packet data with the control data to the first user identifying unit 609 (S223). Upon reading all the packet data with the control data from the queue of the connection, the order control unit 607 shifts the queue to the unblocked state (S225). Processing proceeds to S227.

Subsequent to S225 or if it is determined in S215 that the queue is in an unblocked state, the first user identifying unit 609 extracts the connection identification data from the packet data in response to the reception of the packet data with the control data, and searches the connection table to identify a mapped entry in the assembly control table. The first user identifying unit 609 reads the user identifier in the entry, attaches the user identifier to the control data in the packet data with the control data, and outputs the packet data with the control data with the user identifier attached thereto to the first assembly control setter unit 611 (S227). Processing then proceeds to S229 as described above.

The process layer sorter unit 612 stores, in the queue 613, the packet data with the control data of the packets not output to the message layer. Since the packets are stored in the queue 613 after the packetization process in the message layer, the process order of the packet processor unit 617 is not reversed.

Through the above-described process, the user identifier is identified by simply assembling part of the packets related to the first message from the connection making to the connection breaking. The workload in the message layer is substantially reduced. The packet once output to the message layer is free from a repeated process. The process order of the packet processor unit 617 is free from reversal.

The embodiment described above is based on the premise that one connection is made for one user. In practice, a plurality of users may be present for one connection. If a plurality of users are present for one connection, the user identifier is identified on a per message basis. However, the arrangement of a plurality of users for one connection remains unchanged from the above-described embodiment in that not the whole message is assembled. Packets are assembled until the user identification information and message length are extracted. If the message length is extracted from the header of the message, a message border is identified. At a message border, packets for the next message are assembled. If the user identifier is identified on a per message basis, part of the packets of the message is not assembled. The workload is thus reduced.

The embodiments have been discussed. The technique is not limited to the embodiments. The functional block diagrams are illustrated for exemplary purposes only. Components and modules are not necessarily delineated as illustrated. The operations described above may be changed. For example, the operations may be performed in parallel, and may be reversed in order. Each functional block may be implemented in a hardware configuration, or may be implemented by causing a processor to perform a program.

The relay apparatus may be implemented as a standalone apparatus, or as a computer. A computer, if used, includes memory 2601, CPU 2603, hard disk drive (HDD) 2605, display control unit 2607 connected to a display 2609, drive 2613 for a removable disk 2611, input unit 2615, communication units 2617 (2617*a*, 2617*b*, and 2617*c* in FIG. 35), and bus 2619 interconnecting all these elements as illustrated in FIG. 35. The display control unit 2607, the display 2609, the drive 2613, and the input unit 2615 may not be included in the computer. An operating system (OS) and an application program performing the process of the embodiments are stored on the HDD 2605. The programs, if executed by the CPU 2603, are read onto the memory 2601 from the HDD 2605. The CPU 2603 as appropriate controls the display control unit 2607, the communication unit 2617, and the drive 2613 in order to perform the process. Data input via one of the communication units 2617 may be output via another of the communication units 2617. The CPU 2603 controls the communication units 2617, thereby switching the output destinations thereof. Data in the middle of the process is stored on the memory 2601, and is stored on the HDD 2605 as appropriate. In the embodiments of the technique, the application program for executing the above-described process is stored on the computer readable removable disk 2611 and then is disturbed in the removable disk 2611. The application program is thus installed on the HDD 2605 via the drive 2613. The application program may also be installed onto the HDD 2605 via a network such as the Internet and the communication unit 2617. The computer operates in cooperation with the hardware elements such as the CPU 2603 and the memory 2601 and the OS and the application program and performs the above-described functions.

If the hardware elements such as the CPU 2603 and the memory 2601 operate in cooperation with the OS and the application program, the functional elements performing the process of the relay apparatus are implemented. Each storage unit storing data may be included in one of the memory 2601 and the HDD 2605.

A program for causing the computer to perform the above-described program may be produced. Such a program may be stored on computer readable storage media or computer readable storage devices including a flexible disk, a compact disk random-access memory (CD-ROM), a magnetic-optical disk, a semiconductor memory (such as a ROM), and a hard disk. Interim data may be temporarily stored on a storage device such as a random-access memory (RAM).

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A relay apparatus comprising:
a receiving unit to sequentially receive a first plurality of packets whose payloads constitute a first message, the first message including a header portion containing user identification information;
a packet assembling unit to generate partial message data containing the user identification information by assembling a sequence of packets that have been selected, from among the first plurality of packets, in reception order thereof, until a packet whose payload contains the user identification information is selected;
a user identifying unit to extract the user identification information from the partial message data and identify a user identifier from the user identification information, the user identifier being set, in the relay apparatus, in association with connection identification data extracted from the partial message data;
a packet processor unit to perform a specific packet process, in accordance with the identified user identifier, on the first plurality of packets;
a first control data management unit to extract the connection identification data from the header of the head packet from among the first plurality of packets, and store the connection identification data in the relay apparatus;
a first packet determining unit to set, in the relay apparatus, an assembly flag indicating that the process of the packet assembling unit is necessary, in association with the connection identification data extracted from the header of the head packet from among the first plurality of packets, and output to the packet assembling unit a packet from which the same connection identification data as the connection identification data extracted from the header of the head packet is extracted, during a time period in which the assembly flag indicates that the process of the packet assembling unit is necessary;
a first assembly control setter to set, in the relay apparatus, the assembly flag indicating that the process of the packet assembling unit is not necessary, in association with the connection identification data extracted from the partial message data, when the user identifier is identified by the user identifying unit; and
a packetization processor unit to partition the partial message data into packets which are output to the packet processor unit, wherein
when a second message subsequent to the first message shares the same connection identification data with the first message, the packet processor unit performs the specific packet process, in accordance with the user identifier set in the relay apparatus, on a second plurality of packets whose payloads constitute the second message, without extracting the user identification information from the second message.

2. The relay apparatus according to claim 1, further comprising:
a second packet determining unit to register in a queue the received packet on a per connection basis with the connection of the received packet identified by a header thereof, and outputting a copy of the packet to the packet assembling unit; and
a second assembly control setter unit to cause the packet processor unit to output the packet from the queue of the connection identified by the partial message data when the user identifier is identified by the user identifying unit.

3. The relay apparatus according to claim 1, further comprising:
a first order control unit to register in a queue the packet from which the same connection identification data as the connection identification data extracted from the header of the head packet is extracted when the user identifier is identified by the user identifying unit; and
a queue unblocking commander unit to cause the first order control unit to read the data of the packet from the queue and to output the read data to the packet processor unit when the packetization processor unit has completed a packet partitioning process on the packet from which the same connection identification data as the connection identification data extracted from the header of the head packet is extracted.

4. The relay apparatus according to claim 1, further comprising:
a second control data management unit to extract connection identification data from the header of the head packet from among the first plurality of packets, and store the connection identification data in the relay apparatus;
a third packet determining unit to set, in the relay apparatus, an assembly flag indicating that the process of the packet assembling unit is necessary, with the assembly flag mapped to the connection identification data extracted from the header of the head packet from among the plurality of packets, and register in a first queue a packet from which the same connection identification data as the connection identification data extracted from the header of the head packet is extracted while the assembly flag indicates that the process of the packet assembling unit is necessary, and outputting a copy of the packet to the packet assembling unit;
an assembly control setter unit to set, in the relay apparatus, an assembly flag indicating that the process of the packet assembling unit is not necessary, with the assembly flag mapped to the connection identification data extracted from the partial message data when the user identifier is identified by the user identifying unit, and to cause the third packet determining unit to read the packet from the first queue and to output the packet to the packet processing unit; and a second order control unit to register in a second queue the packet from which the same connection identification data as the connection identification data extracted from the header of the head packet is extracted, when the user identifier is identified by the user identifying unit, wherein the third packet determining unit reads all the packets from the first packet before reading a packet from the second queue of the second order control unit.

5. A relay apparatus comprising:

a hardware processor configured to execute a procedure, the procedure comprising:

sequentially receiving a plurality of packets whose payloads constitute a first message, the first message including a header portion containing user identification information;

generating partial message data containing the user identification information by assembling a sequence of packets that have been selected, from among the first plurality of packets, in reception order thereof, until a packet whose payload contains the user identification information is selected;

extracting the user identification information from the partial message data and identifying a user identifier from the user identification information, the user identifier being set, in the relay apparatus, in association with connection identification data extracted from the partial message data;

performing a specific packet process, in accordance with the identified user identifier, on the first plurality of packets extracting the connection identification data from the header of the head packet from among the first plurality of packets, and storing the connection identification data in the relay apparatus;

setting, in the relay apparatus, an assembly flag indicating that a partial message generation process of generating the partial message data is necessary, in association with the connection identification data extracted from the header of the head packet from among the first plurality of packets, and outputting to the partial message generation process a packet from which the same connection identification data as the connection identification data extracted from the header of the head packet is extracted, during a time period in which the assembly flag indicates that the partial message generation process is necessary;

setting, in the relay apparatus, the assembly flag indicating that the partial message generation process is not necessary, in association with the connection identification data extracted from the partial message data, when the user identifier is identified; and partitioning, in accordance with the identified user identifier, the partial message data into packets which are output to the partial message generation process, wherein when a second message subsequent to the first message shares the same connection identification data with the first message, the specific packet process is performed, in accordance with the user identifier set in the relay apparatus, on a second plurality of packets whose payloads constitute the second message, without extracting the user identification information from the second message.

6. A computer-readable, non-transitory medium storing a relay program that causes a relay apparatus to execute a procedure, the procedure comprising:

sequentially receiving a first plurality of packets whose payloads constitute a first message, the first message including a header portion containing user identification information;

generating partial message data containing the user identification information by assembling a sequence of packets that have been selected, from among the first plurality of packets, in reception order thereof, until a packet whose payload contains the user identification information is selected;

extracting the user identification information from the partial message data and identifying a user identifier from the user identification information; performing a specific packet process, in accordance with the identified user identifier, on the plurality of packets;

extracting the connection identification data from the header of the head packet from among the first plurality of packets, and storing the connection identification data in the relay apparatus;

setting, in the relay apparatus, an assembly flag indicating that a partial message generation process of generating the partial message data is necessary, in association with the connection identification data extracted from the header of the head packet from among the first plurality of packets, and outputting, to the partial message generation process, a packet from which the same connection identification data as the connection identification data extracted from the header of the head packet is extracted, during a time period in which the assembly flag indicates that the partial message generation process is necessary;

setting, in the relay apparatus, the assembly flag indicating that the partial message generation process is not necessary, in association with the connection identification data extracted from the partial message data, when the user identifier is identified; and partitioning, in accordance with the identified user identifier, the partial message data into packets which are output to the partial message generation process, wherein when a second message subsequent to the first message shares the same connection identification data with the first message, the specific packet process is performed, in accordance with the user identifier set in the relay apparatus, on a second plurality of packets whose payloads constitute the second message, without extracting the user identification information from the second message.

7. A relay method of a processor of a relay apparatus, the relay method comprising:

sequentially receiving a first plurality of packets whose payloads constitute a first message, the first message including a header portion containing user identification information;

generating partial message data containing the user identification information by assembling a sequence of packets that have been selected, from among the plurality of packets, in reception order thereof, until a packet whose payload contains the user identification information is selected;

extracting the user identification information from the partial message data and identifying a user identifier from the user identification information; and performing a specific packet process, in accordance with the identified user identifier, on the plurality of packets;

extracting the connection identification data from the header of the head packet from among the first plurality of packets, and storing the connection identification data in the relay apparatus;

setting, in the relay apparatus, an assembly flag indicating that a partial message generation process of generating the partial message data is necessary, in association with the connection identification data extracted from the header of the head packet from among the first plurality of packets, and outputting, to the partial message generation process, a packet from which the same connection identification data as the connection identification data extracted from the header of the head packet is extracted, during a time period in which the assembly flag indicates that the partial message generation process is necessary;

setting, in the relay apparatus, the assembly flag indicating that the partial message generation process is not necessary, in association with the connection identification data extracted from the partial message data, when the user identifier is identified; and partitioning, in accordance with the identified user identifier, the partial message data into packets which are output to the partial message generation process, wherein when a second message subsequent to the first message shares the same connection identification data with the first message, the specific packet process is performed, in accordance with the user identifier set in the relay apparatus, on a second plurality of packets whose payloads constitute the second message, without extracting the user identification information from the second message.

* * * * *